(12) United States Patent
Weber et al.

(10) Patent No.: US 12,517,627 B2
(45) Date of Patent: Jan. 6, 2026

(54) WEARABLE DEVICE MIXED GAZE TRACKING

(71) Applicant: GOOGLE LLC, Mountain View, CA (US)

(72) Inventors: Jochen Weber, San Francisco, CA (US); Tobias Toft, San Mateo, CA (US); Ryan Alexander West, Carleton Place (CA); Cosmo Rettig, Mill Valley, CA (US); Prasanthi Gurumurthy, San Jose, CA (US); Joost Korngold, Morgan Hill, CA (US); Tarik Hany Abdel-Gawad, San Francisco, CA (US); Samuel Legge, Waterloo (CA); Jingying Hu, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 3 days.

(21) Appl. No.: 18/477,188

(22) Filed: Sep. 28, 2023

(65) Prior Publication Data

US 2025/0110612 A1    Apr. 3, 2025

(51) Int. Cl.
*G06F 3/0482* (2013.01)
*G02B 27/01* (2006.01)
*G06F 3/01* (2006.01)

(52) U.S. Cl.
CPC ........ *G06F 3/0482* (2013.01); *G02B 27/017* (2013.01); *G06F 3/012* (2013.01); *G06F 3/013* (2013.01); *G02B 2027/0178* (2013.01)

(58) Field of Classification Search
CPC ..... G06F 3/0482; G06F 3/012; G02B 27/017; G02B 2027/0178
See application file for complete search history.

(56) References Cited

U.S. PATENT DOCUMENTS 10,914,957 B1 *  2/2021  Stahl ................. G06F 3/013
11,995,231 B2 *  5/2024  Aurongzeb ........ G06F 3/016
2012/0287040 A1 * 11/2012  Moore .............. G02B 27/01
                                                         345/157

(Continued)

FOREIGN PATENT DOCUMENTS

WO    WO-2017192177 A1 * 11/2017 ............. G06F 3/011
WO    2022212058 A1    10/2022

OTHER PUBLICATIONS

Khan, et al., "Gaze and Eye Tracking: Techniques and Applications in ADAS", Sensors 2019, 19, 5540; doi:10.3390/s19245540; www.mdpi.com/journal/sensors, 2019, 36 pages.

(Continued)

*Primary Examiner* — Stacy Khoo
(74) *Attorney, Agent, or Firm* — Brake Hughes Bellermann LLP

(57) ABSTRACT

A method including determining an eye-gaze characteristic of a user of a wearable device, determining a head movement of the user, determining a gesture based on the eye-gaze characteristic, the head movement, and a correlation between the eye-gaze characteristic and the head movement, selecting a user interface (UI) element of a head-locked UI operating on the wearable device based on the gesture, and triggering a UI operation based on the selected UI element.

20 Claims, 15 Drawing Sheets

(56) References Cited

U.S. PATENT DOCUMENTS

| | | | |
|---|---|---|---|
| 2014/0247232 A1* | 9/2014 | George-Svahn | G06F 3/012 |
| | | | 345/184 |
| 2017/0123491 A1* | 5/2017 | Hansen | G06F 3/012 |
| 2022/0155909 A1 | 5/2022 | Kawashima et al. | |
| 2022/0187907 A1 | 6/2022 | Lee et al. | |
| 2023/0071037 A1* | 3/2023 | Kim | G06F 3/04886 |

OTHER PUBLICATIONS

Kothari, et al., "Gaze-in-Wild: a Dataset for Studying Eye and Head Coordination in Everyday Activities", Scientific Reports, 10:2539; www.nature.com/scientificreports; https://doi.org/10.1038/s41598-020-59251-5, 2020, 18 pages.

International Search Report and Written Opinion for PCT Application No. PCT/US2024/048954, mailed on Dec. 12, 2024, 13 pages.

* cited by examiner

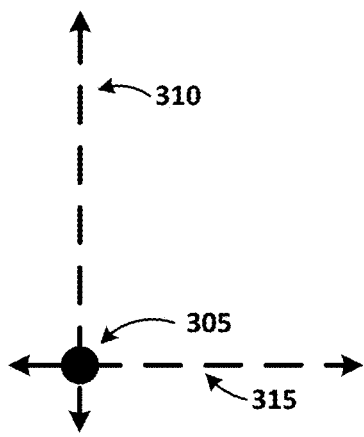
FIG. 3A
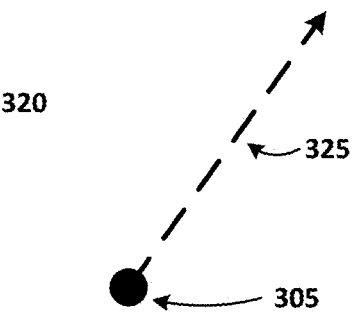
FIG. 3B
FIG. 3C
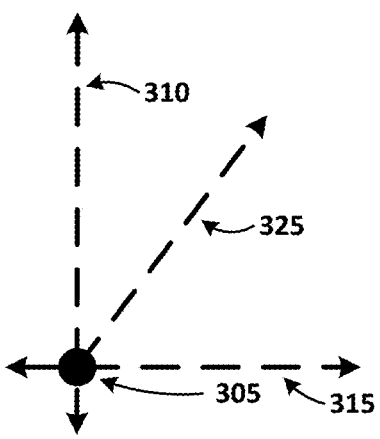
FIG. 3D
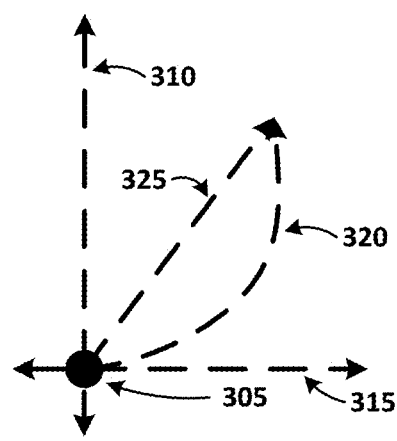
FIG. 3E

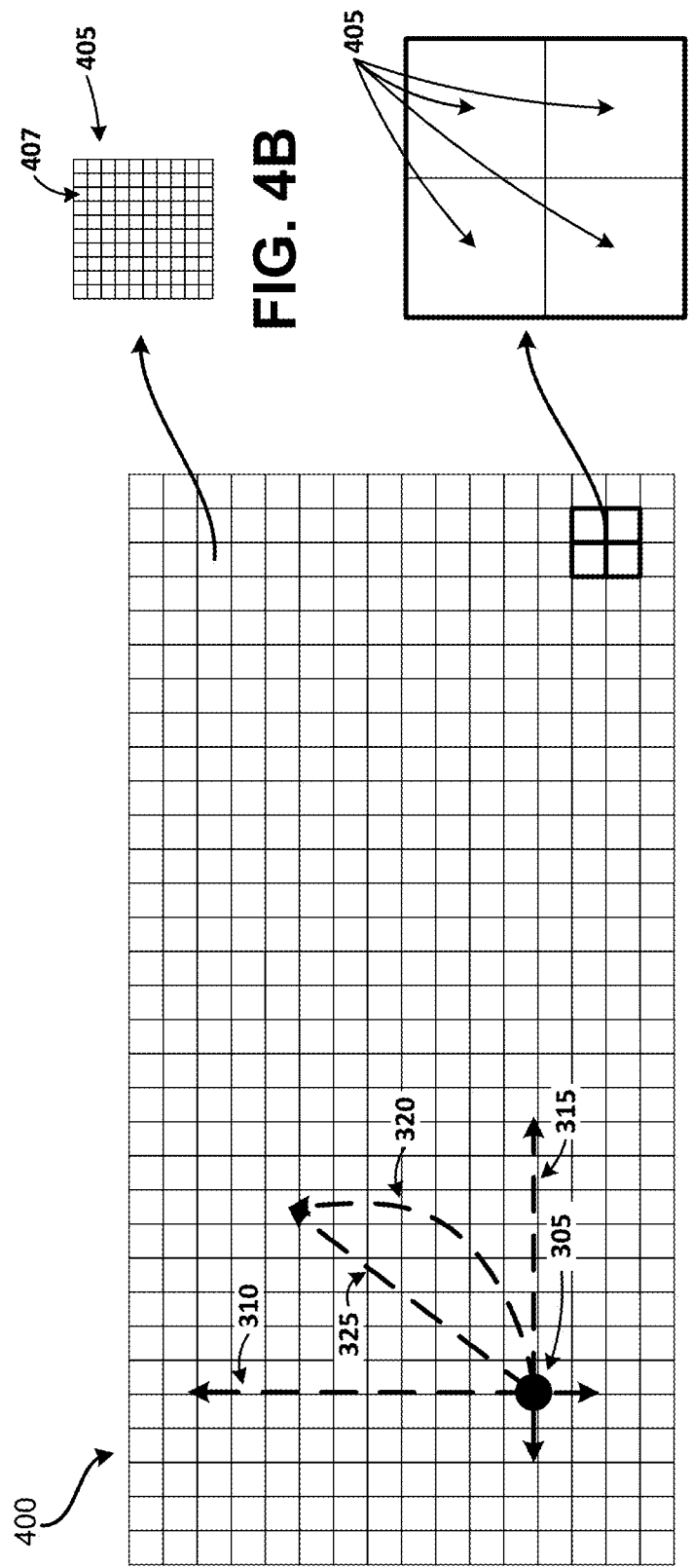

WEARABLE DEVICE MIXED GAZE TRACKING

FIELD

Implementations relate to gaze tracking of a wearable device.

BACKGROUND

Wearable devices including augmented reality (AR) glasses allow users to quickly access functionalities of general-purpose computers throughout the user's day, across any activity without being disrupted, by presenting content visually in the field of view of the user.

SUMMARY

Implementations relate to interacting with a user interface (UI) of a wearable device (e.g., AR headset, AR glasses, and the like) by addressing elements (e.g., icon, menu, and the like) with a combined head movement and eye-gaze. More specifically, the subject matter relates to generating a gesture based on a correlation between eye movement and head movements in relation to a UI element. The gesture can be used to make discrete UI selections including, for example, selecting an icon, selecting a menu item, gazing away from the UI (e.g., can trigger closing the UI), and the like.

In a general aspect, a device, a system, a non-transitory computer-readable medium (having stored thereon computer executable program code which can be executed on a computer system), and/or a method can perform a process with a method including determining an eye-gaze characteristic of a user of a wearable device, determining a head movement of the user, determining a gesture based on the eye-gaze characteristic, the head movement, and a correlation between the eye-gaze characteristic and the head movement, selecting a user interface (UI) element of a head-locked UI operating on the wearable device based on the gesture, and triggering a UI operation based on the selected UI element.

BRIEF DESCRIPTION OF THE DRAWINGS

Example implementations will become more fully understood from the detailed description given herein below and the accompanying drawings, wherein like elements are represented by like reference numerals, which are given by way of illustration only and thus are not limiting of the example implementations.

FIG. 3A illustrates an eye tracking gaze position graph according to an example implementation.

FIG. 3B illustrates a head tracking movement position graph according to an example implementation.

FIG. 3C illustrates an eye tracking gaze movement graph according to an example implementation.

FIG. 3D illustrates an eye tracking gaze position plus gaze movement graph according to an example implementation.

FIG. 3E illustrates an eye tracking gaze position plus gaze movement plus head movement graph according to an example implementation.

FIGS. 4A, 4B, and 4C illustrate block diagrams of a portion of a wearable device user interface (UI) design including sectors according to an example implementation.

Figure 1A:
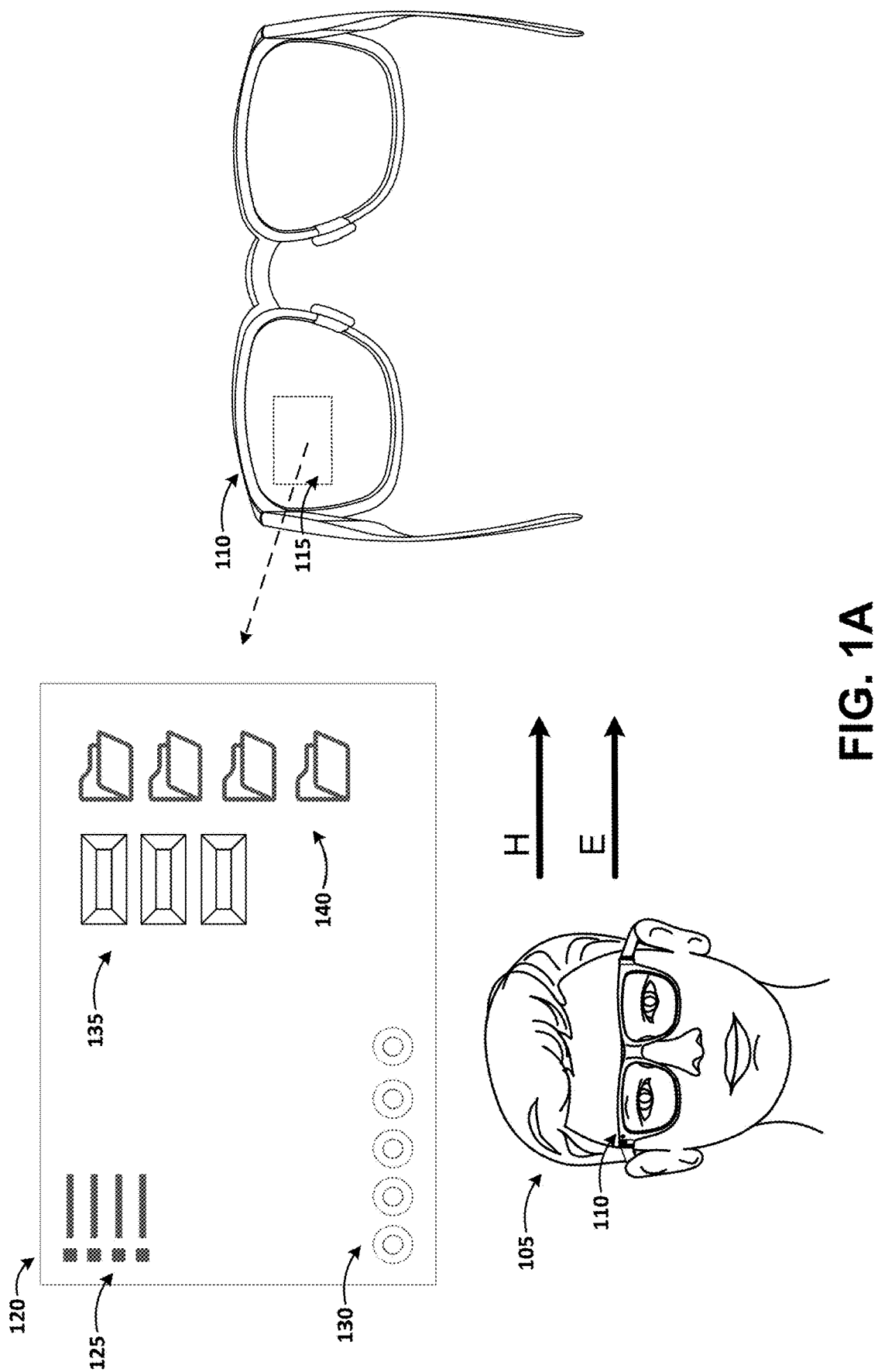
FIGS. 1A, 1B, 1C, 1D, and 1E illustrate pictorial representations of scenarios for performing mixed gaze tracking according to an example implementation(s).

It should be noted that these Figures are intended to illustrate the general characteristics of methods, and/or structures utilized in certain example implementations and to supplement the written description provided below. These drawings are not, however, to scale and may not precisely reflect the precise structural or performance characteristics of any given implementation and should not be interpreted as defining or limiting the range of values or properties encompassed by example implementations. For example, the positioning of modules and/or structural elements may be reduced or exaggerated for clarity. The use of similar or identical reference numbers in the various drawings is intended to indicate the presence of a similar or identical element or feature.

DETAILED DESCRIPTION

A user of a computing device may require one or more peripheral devices to interact with software (e.g., a user interface) and/or hardware (e.g., camera) of the computing device. For example, typical computing devices may use a mouse, keyboard, touch interface and the like. However, a technical problem associated with a wearable device can be that the wearable device may not have the interfaces required to connect a mouse, keyboard, touch interface, and the like to the wearable device. Further, carrying around a peripheral device may result in a poor user experience. A technical solution can be to perform the functions of the peripheral device on the wearable device (e.g., as a similar function of the peripheral devices of the computing device) based on movement of the user's eyes and/or head. The technical effect of performing the functions of the peripheral device on the wearable device based on movement of the user's eyes and/or head can be to enable the user to interact with software (e.g., a user interface) and/or hardware (e.g., camera) of the wearable device without the use of a physical peripheral device resulting in an improved user experience.

Implementations relate to interacting with a user interface (UI) of a wearable device (e.g., AR headset, AR glasses, and the like) by addressing elements (e.g., icon, menu, and the like) with an eye-gaze and/or a head movement. More specifically, the subject matter relates to making discrete UI selections including, for example, selecting an icon, selecting a menu item, gazing away from the UI (e.g., can trigger closing the UI), and the like using an eye-gaze and/or a head movement. The selected UI element can trigger an operation associated with the UI. In an example implementation, the UI design can include sectors (e.g., blocks, N×N blocks, quadrants, and the like) including the UI elements. The sectors can improve the accuracy of the selection of the UI element. In some implementations, the subject matter relates to generating a gesture based on a differential eye movement within the UI. For example, a gesture can be generated based on eye movement from a first sector to a second sector.

As discussed above, wearable devices including augmented reality (AR) glasses can allow users to quickly access functionalities of general-purpose computers by presenting content visually in the field of view of the user. However, a problem with current wearable technology is that there is no mechanism for hands-free UI interaction without an accessory device and/or user disruption (e.g., touching the wearable device by the user). Therefore, a new technology enabling intuitive, non-disruptive, and reliable interactions with allowing users to interact with user interface (UI) elements is needed. The interactions with the UI elements should be unaffected by movement (e.g., head movement independent of the UI) and motion (e.g., user walking). Example implementations solve this problem by providing a system for addressing UI elements with an eye-gaze and/or head motion gesture interface.

Example implementations include an interaction system for head-locked UIs. The system can process inputs including head movements (e.g., three (3) degrees of freedom (DoF) head movements, acceleration, gyro, and the like) and eye-gaze characteristics (e.g., saccades, eye-gaze vector, a timestamp associated with the eye-gaze vector, and/or a velocity associated with the eye-gaze vector, and/or the like) and a UI with a sectored (e.g., N×N blocks or quadrant) and head-locked visual UI. The system can be controlled based on a users' natural interaction with the wearable device that includes moving their eyes towards visual UI elements. In some implementations the eye-gaze can be correlated with (e.g., to confirm an eye-gesture detection) corresponding head movements to generate a gesture to make discrete UI selections. In addition to the user experience benefits, the system can reduce the accuracy and calibration requirements for eye tracking technology resulting in cost savings compared to traditional eye-tracking systems.

FIGS. 1A-1E illustrate pictorial representations of scenarios for performing mixed gaze tracking according to an example implementation(s). As shown in FIGS. 1A-1E, user 105 can wear a wearable device 110 (e.g., AR headset, AR glasses, and the like). The wearable device 110 can have a display area 115 on a lens (e.g., one or more lens) of the wearable device 110. The display area 115 can be configured to display a user interface (UI) 120. The UI 120 can include a plurality of UI elements 125, 130, 135, 140.

Some implementations can relate to making discrete UI selections including, for example, selecting one of UI elements 125, 130, 135, 140 (e.g., as an icon, a menu item, a folder, a radio button and/or the like) eye-gaze and/or a head movement. The eye-gaze and/or a head movement can correspond to a gesture and the gesture can cause the selection of one of UI elements 125, 130, 135, 140. In some implementations, a correspondence between the eye-gaze and the head movement can be used to indicate and/or identify a gesture.

For example, referring to FIG. 1A, an arrow H indicates a direction of head movement of the user 105. Further, an arrow E indicates the direction of eye-gaze movement of the user 105. In FIG. 1A, the direction of head movement and the direction of eye-gaze movement is in the same direction. The direction is illustrated as being to the right. However, the direction can be any direction, left, right, up, down, and any direction in-between. If the direction of head movement and the direction of eye-gaze movement are in the same direction and the distance moved meets a criteria (e.g., is below a threshold distance moved), eye-gaze within the boundary of the UI 120 can indicate a gesture is being performed. Further, the location of the eye-gaze (e.g., fixation point described below) can indicate the selection of one of UI elements 125, 130, 135, 140. In other words, small eye-gaze and/or head movements can indicate the user 105 is performing a gesture. Further, movements in the same direction can confirm the user 105 is performing a gesture.

If the direction of head movement and the direction of eye-gaze movement are in the same direction and the distance moved does not meet a criteria (e.g., is above a threshold distance moved), the movement can indicate the user is observing something within the real-world (e.g., not looking within the UI 120). In other words, large eye-gaze and/or head movements can indicate the user 105 is not performing a gesture and instead is observing the real-world and/or is looking outside the boundaries of the UI 120.

Figure 1B:
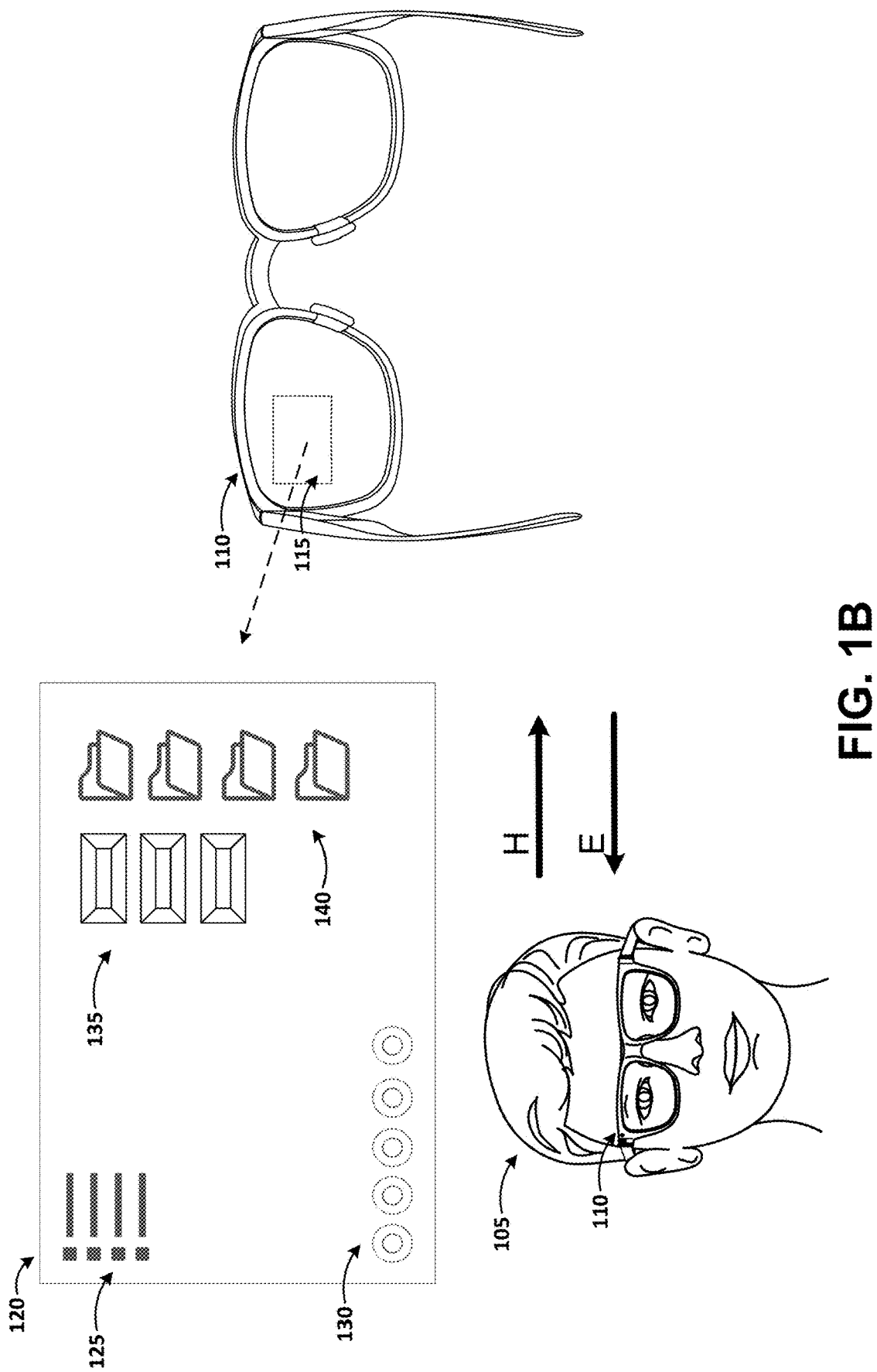

For example, referring to FIG. 1B, the arrow H indicates a direction of head movement of the user 105. Further, the arrow E indicates the direction of eye-gaze movement of the user 105. In FIG. 1B, the direction of head movement and the direction of eye-gaze movement is in a different (e.g., opposite) direction. The direction is illustrated as head movement to the right and eye-gaze movement to the left. However, the direction can be any (opposite) direction, left, right, up, down, and any direction in-between. If the direction of head movement and the direction of eye-gaze movement are in different directions, user 105 may not be intending to perform a gesture. For example, some events can cause the user 105 to be pushed (e.g., a user walking can bump into another individual) causing the user's 105 head to move. At the same time, the user's eyes are trying to maintain eye-gaze on substantially the same location of the UI 120 (e.g., fixation point described below). Therefore, the direction of head movement and the direction of eye-gaze movement is in a different direction. Therefore, the head movement and the eye-gaze movement can indicate that the user 105 is not intending to perform a gesture.

Figure 1C:
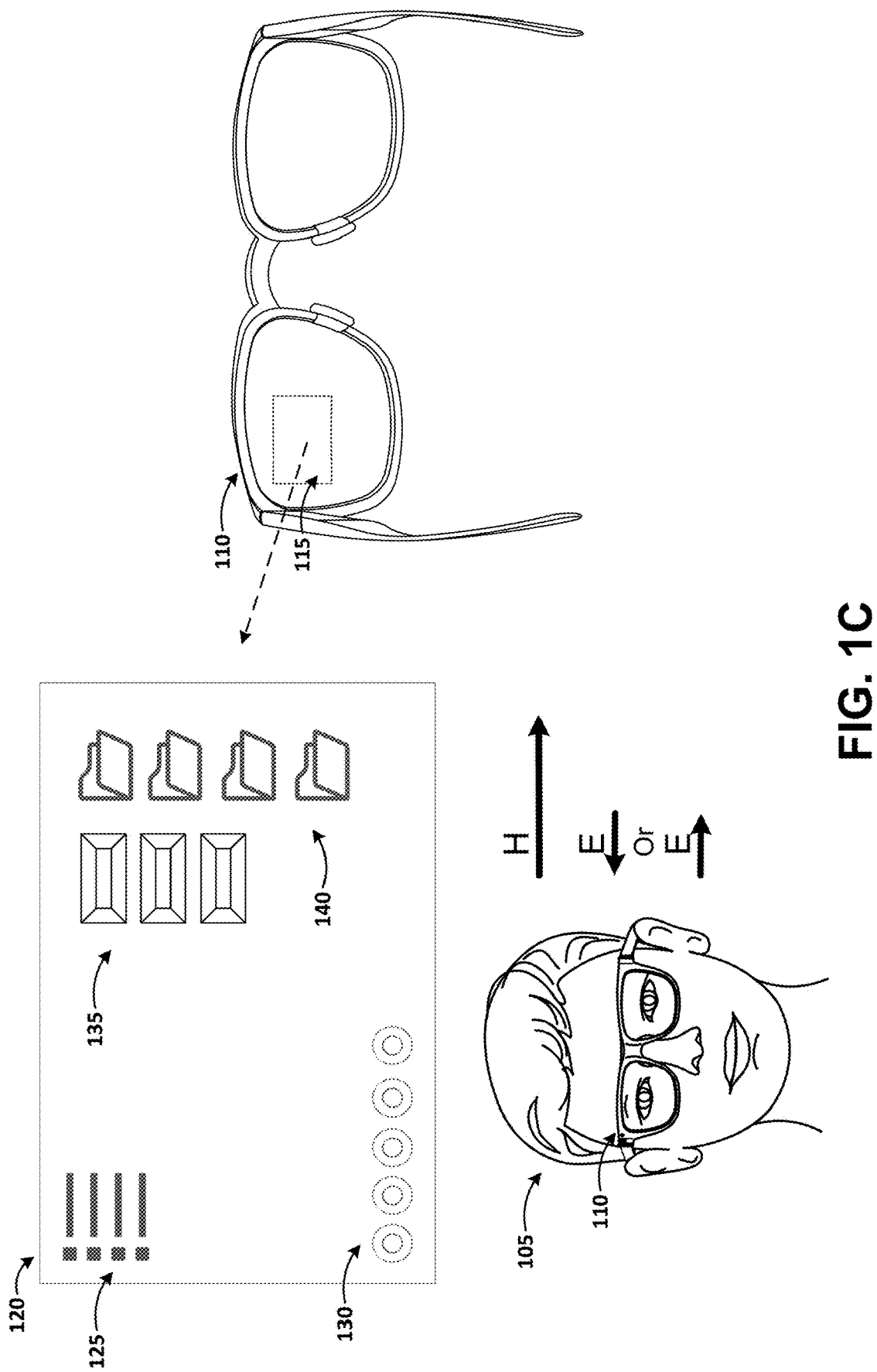

For example, referring to FIG. 1C, the arrow H indicates a direction of head movement of the user 105. Further, the arrow E indicates the direction of eye-gaze movement of the user 105. In FIG. 1C, the direction of head movement and the direction of eye-gaze movement can be in the same direction or can be in a different (e.g., opposite) direction. The direction is illustrated as head movement to the right and eye-gaze movement to the left or right. However, the direction can be any (opposite) direction, left, right, up, down, and any direction in-between. If the direction of head movement and the direction of eye-gaze movement are in the same or different direction and the head movement distance does not meet a criteria (e.g., is above a threshold distance moved), the movement can indicate the user is observing something within the real-world (e.g., not looking within the UI 120). In other words, large head movements can indicate the user 105 is not performing a gesture and instead is observing the real-world and/or is looking outside the boundaries of the UI 120.

Figure 1D:
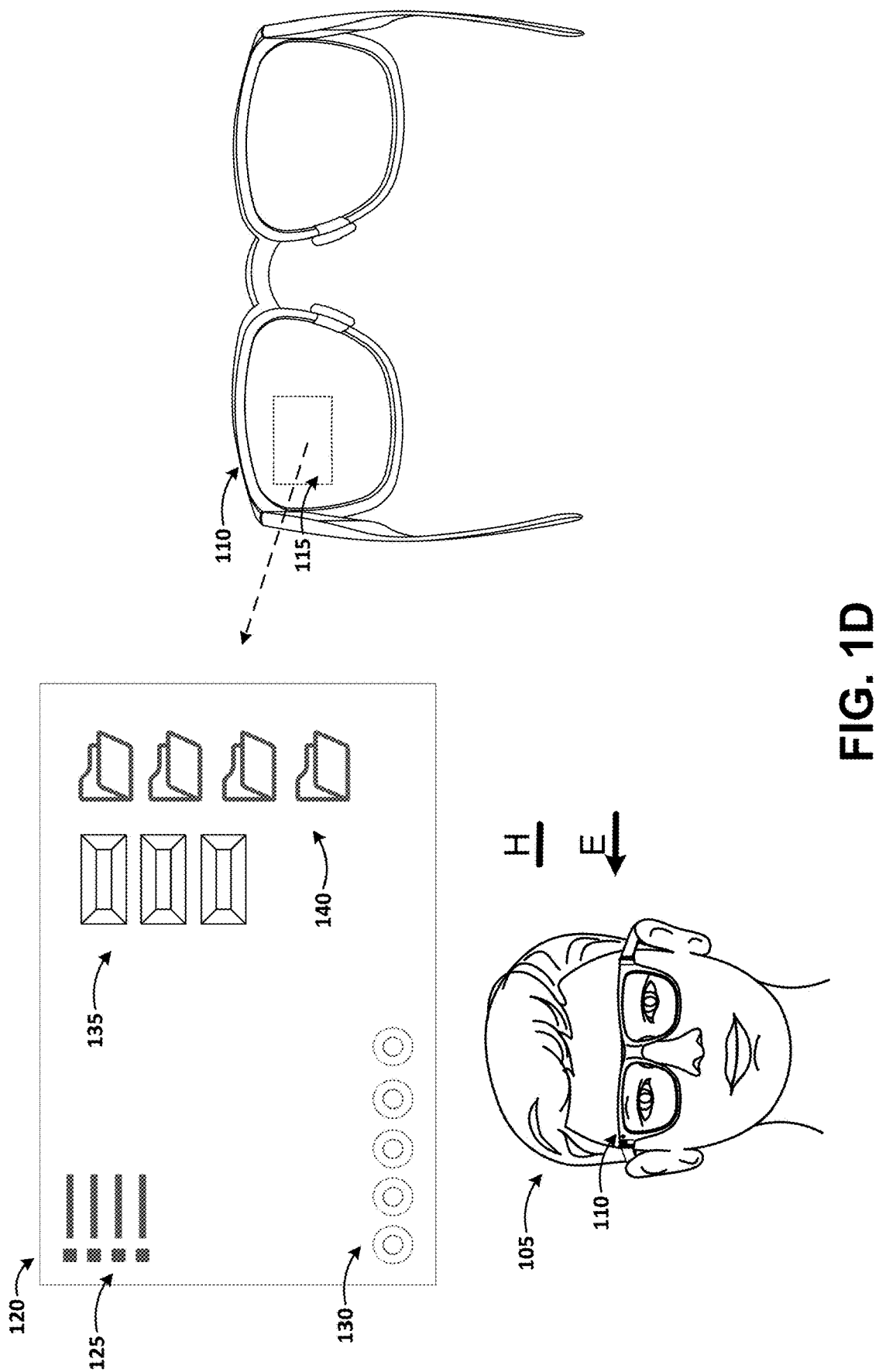

For example, referring to FIG. 1D, a line (e.g., not an arrow) H indicates minimal to no head movement of the user 105. Further, an arrow E indicates the direction of eye-gaze movement of the user 105. In FIG. 1D, the direction of eye-gaze movement does not affect the determination as to whether or not user 105 is intending to perform a gesture. The direction is illustrated as being to the left. However, the direction can be any direction, left, right, up, down, and any direction in-between. If there is minimal to no head movement and the distance of eye-gaze movement meets a criteria (e.g., is below a threshold distance moved), eye-gaze within the boundary of the UI 120 can indicate a gesture is being performed. Further, the location of the eye-gaze on the UI 120 (e.g., fixation point described below) can indicate the selection of one of UI elements 125, 130, 135, 140. In other words, eye-gaze movements alone can indicate the user 105 is performing a gesture.

Figure 1E:
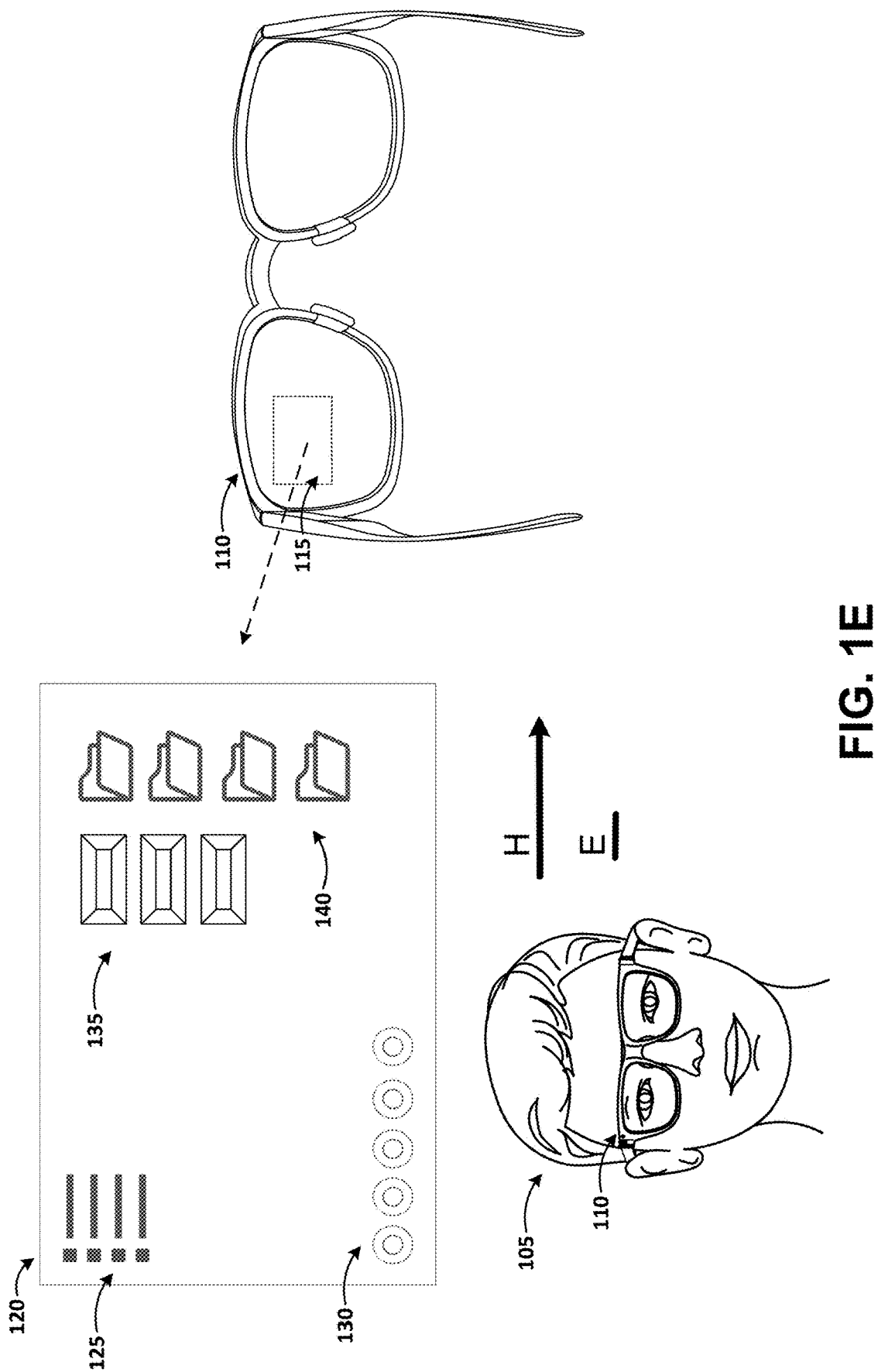

For example, referring to FIG. 1E, the arrow H indicates the direction of head movement of the user 105. Further, the line (e.g., not an arrow) E indicates minimal to no eye-gaze movement of the user 105. In FIG. 1E, the direction of head movement is illustrated as head movement to the right. However, the direction of head movement can be any direction, left, right, up, down, and any direction in-between. If the head movement distance does not meet a criteria (e.g., is above a threshold distance moved), the movement can indicate the user is observing something within the real-world (e.g., not looking within the UI 120). In other words, large head movements can indicate the user 105 is not performing a gesture and instead is observing the real-world and/or is looking outside the boundaries of the UI 120.

Figure 2:
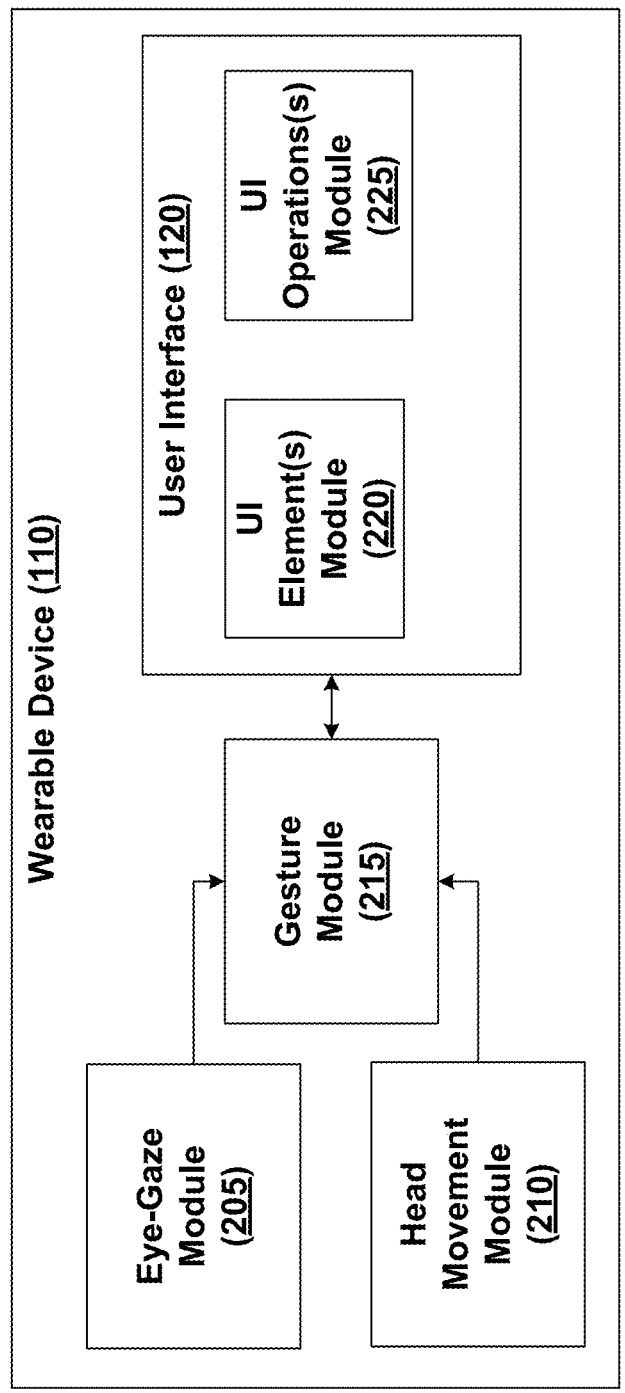
FIG. 2 illustrates a block diagram of a data flow of a wearable device according to an example implementation.

In any of the examples of FIGS. 1A-1E, if a gesture of the user 105 has been performed (or determined to be being performed), the final eye-gaze location on the UI 120 (e.g., fixation point described below) can be used to determine the user's 105 intent. For example, the gesture can be used to determine which of the UI elements 125, 130, 135, 140 the user 105 intends to interact with. Interacting with one of the UI elements 125, 130, 135, 140 can be configured to trigger a UI operation based on the selected UI element. For example, UI elements 140 are illustrated as folders. Therefore, interacting with one of the UI elements 140 can cause the folder to open within the display area 115. FIG. 2 can be used to further describe the user 105 interacting with the UI 120 on the wearable device 110.

FIG. 2 illustrates a block diagram of a data flow of a wearable device 110 according to an example implementation. The data flow is associated with a system for addressing UI elements of the UI operating on the wearable device 110 using a combined user head movement and eye-gaze gesture interface. The wearable device 110 can be a head worn device. For example, the wearable device 110 can be an AR/VR headset, smartglasses and the like. As shown in FIG. 2, the system includes an eye-gaze module 205, a head movement module 210, a gesture module 215, and a UI 120. The UI 120 includes a UI element(s) module 220 and a UI operation(s) module 225.

The eye-gaze module 205 can be configured to track an eye-gaze of a user of the wearable device 110. The eye-gaze module 205 can be configured to determine an eye-gaze characteristic of a user of a wearable device. The eye-gaze characteristic can be related to a gaze (e.g., movement of the eyes) of a user (e.g., person wearing) the wearable device 110. For example, the wearable device 110 can include hardware and software that senses eye movement and generates data including orientation, velocity, direction, position, and/or the like of the eyes before, during, and after the eye movement. The eye-gaze characteristic can be selected, determined, generated, calculated, and/or the like using the generated data. In some implementations, eye-gaze module 205 can be configured to select, determine, generate, calculate, and/or the like the eye-gaze characteristic(s) using the generated data.

For example, referring to FIGS. 1A-1E, the eye-gaze module 205 can be configured to generate an eye-gaze movement including an eye-gaze direction (e.g., arrow E), the eye-gaze distance moved and to determine whether or not meets the eye-gaze distance moved the criteria (e.g., is below a threshold distance moved) to indicate the user's 105 intent to perform a gesture. If the eye-gaze module 205 determines that the user 105 intends to perform a gesture, the eye-gaze module 205 can be configured to communicate data associated with the eye-gaze movement and/or data associated with the eye-gaze characteristic(s) to the gesture module 215.

The head movement module 210 can be configured to determine a head movement of the user of the wearable device 110. For example, the wearable device can include an IMU configured to generate IMU data. The IMU data can include IMU data 733 (e.g., rotational velocity, acceleration, position, orientation, velocity, and/or the like) of the head. The IMU data can be obtained (e.g., received from the IMU) by the head movement module 210 and used to track head movement of the user wearing the wearable device. The head movement module 210 can be configured to generate, store, and/or communicate head movement data. The head movement module 210 can be configured to generate, store, and/or communicate a head movement including, for example, a head motion vector. For example, the head movement data can include tracking (e.g., storing time-stamped data) including position, direction, orientation, and the like of the head. The head motion vector can be calculated based on the head movement data.

For example, referring to FIGS. 1A-1E, the head movement module 210 can be configured to generate a head movement including a head movement direction (e.g., arrow H), the head distance moved and to determine whether or not meets the head distance moved the criteria to indicate the user's 105 intent to perform a gesture. If the head movement module 210 determines that the user 105 intends to perform a gesture, the head movement module 210 can be configured to communicate data associated with the head movement and/or IMU data to the gesture module 215.

The gesture module 215 can be configured to determine a gesture based on the eye-gaze characteristic, the head movement, and a correlation between the eye-gaze characteristic and the head movement. In an example implementation, gaze tracking can be used to determine a gesture by combining a current gaze position, head movement, and gaze movement. For example, a gesture can be determined by determining the current gaze position, determining a head movement and determining a gaze movement and combining the three as a gesture. For example, referring to FIG. 3E, the gesture can be determined based on the gaze position 305, head movement along line 320 and the gaze movement along line 325. Further, whenever the user's eye-gaze changes a head motion should be along the same vector as the eye-gaze vector thus confirming the eye-gaze. Moving along the same vector can indicate a correlation between the eye-gaze characteristic and the head movement. The gesture module 215 can be configured to determine a fixation point based on the gesture. A fixation point can be a position, location, and the like on the UI the user gazing or looking at. A fixation point is described in more detail below.

The UI 120 can be configured as an interface between the user of the wearable device 110 and the hardware of the wearable device 110. The UI 120 can be a visual UI (e.g., the interface is visible on a display of the wearable device 110). The UI 120 can be a head-locked visual UI. The user interface, when head-locked, can remain in a stationary position on a display of the wearable device 110 while the wearable device 110 (e.g., when head-mounted) moves and different objects from the physical environment outside the wearable device 110 are visible to the user and move with respect to the user interface. By contrast, when world-locked the UI 120 can remain stationary with respect to the objects from the physical environment outside the wearable device 110 while the wearable device 110 moves. In such situations, the user interface elements can move within the display.

The UI 120 includes a UI element(s) module 220 and a UI operation(s) module 225. A UI element (e.g., UI elements 125, 130, 135, 140) can be, for example, an icon, a menu, and the like. The UI element(s) module 220 can be configured to manage the UI element(s) visually displayed on the UI 120. For example, the UI element(s) module 220 can be configured to manage a location of a UI element, an operation triggered by the UI element, a dimension of the UI element, a characteristic (e.g., color) of the UI element, associations between (e.g., a relationship to another) UI element(s), and the like.

The UI element(s) module 220 can be configured to select a UI element of a head-locked UI operating on the wearable device based on the gesture. For example, The UI element(s) module 220 can be configured to select a UI element based on a fixation associated with the gesture. In some implementations, the UI element(s) module 220 can include a map (e.g., a table) including a map between fixation points and a UI element. Therefore, the UI element(s) module 220 can be configured to select the UI element from the map using the fixation point as determined by the gesture module 215. The UI element can be looked-up in the map by selecting (e.g., filtering) the fixation point in the map.

The UI operation(s) module 225 can be configured to trigger UI operations. The UI operations can be triggered by a UI element. For example, an interaction with an icon can cause (e.g., trigger) a contact(s) to be displayed. UI operations can be triggered without interacting with an icon. In response to selecting the UI element, the UI operation(s) module 225 can be configured to trigger a UI operation based on the UI element. In some implementations, the UI operation(s) module 225 can include a map (e.g., a table) including a map between a UI element and a UI operation. Therefore, the UI operation(s) module 225 can be configured to select the UI operation from the map using the UI element as determined by the UI element(s) module 220. The UI element can be looked-up in the map by selecting (e.g., filtering) the UI element in the map.

For example, the UI 120 can be displayed or hidden without interacting with an icon. As an example, the UI 120 can be displayed or hidden based on a criterion. For example, the UI 120 can be hidden after a threshold period of no user interactions. The UI operations can be associated with wearable device 110 components and can be triggered by a UI element. For example, an interaction with an icon can cause (e.g., trigger) an image to be captured by a camera of the wearable device 110.

In a visual UI, a user typically looks at the UI elements that the user is interacting with. For example, referring to FIG. 3A, the user can be currently looking at a UI element represented by gaze position 305. From an absolute eye tracking perspective, gaze position 305 is located at some point along an x-axis 315 and a y-axis 310 within the UI (e.g., UI 120). When the user moves the user's head, the movement is typically non-linear. For example, referring to FIG. 3B, the user can have a head movement along line 320. When the user moves the user's gaze (e.g., eye movement), the movement is typically linear. For example, referring to FIG. 3C, the user can have a gaze movement along line 325.

In an example implementation, using gaze tracking to determine a gesture can be accomplished by combining a current gaze position (FIG. 3A) and gaze movement (FIG. 3C). For example, a gesture can be determined by determining the current gaze position 305 and determining a gaze movement (e.g., along line 325) and combining the two as a gesture. In some implementations, a gesture can relate to a gaze-based user input configured to interact with an element of the UI operating on the wearable device. For example, referring to FIG. 3D, the gesture can be determined based on gaze position 305 and the gaze movement along line 325. The technique shown in FIG. 3D is an effective tool for determining a gesture. However, this technique may rely on margins and/or paddings within the UI to identify a UI element that may be selected based on the gesture which may decrease the available space for content. In addition, the gaze position may be dependent on the accuracy of a calibration.

In an example implementation, using gaze tracking to determine a gesture can be accomplished by combining a current gaze position (FIG. 3A), head movement (FIG. 3B), and gaze movement (FIG. 3C). For example, a gesture can be determined by determining the current gaze position 305, determining a head movement (e.g., along line 320) and determining a gaze movement (e.g., along line 325) and combining the three as a gesture. For example, referring to FIG. 3E, the gesture can be determined based on the gaze position 305, head movement along line 320 and the gaze movement along line 325.

In an example implementation, a vector can include direction and velocity data. The direction and velocity can be determined using eye tracking data (e.g., gaze data 770 described in more detail below). For example, eye tracking data can include a glint vector. The glint vector can be based on a glint spot which is based on a relative position of a pupil center and a corneal reflection. An eye-gaze vector can be a vector from the glint spot to the pupil center that indicates which direction the eye is pointing in relation to the camera. Therefore, the gaze movement along line 325 can be based on the eye-gaze vector and the gaze position 305. In some implementations, the eye tracking data can include eye-gaze characteristics that can be and/or can include the eye-gaze vector, the glint vector, the glint spot, a timestamp associated with the eye-gaze vector, and/or a velocity associated with the eye-gaze vector.

Figure 4E:
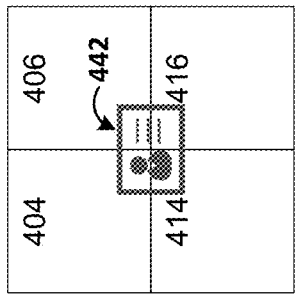
FIGS. 4D, 4E, and 4F illustrate block diagrams of a portion of a wearable device user interface (UI) design including sectors and UI elements according to an example implementation.

FIGS. 4A, 4B, and 4C illustrate block diagrams of a portion of a wearable device user interface (UI) design including sectors according to an example implementation. As shown in FIG. 4A, the UI 300 can include a plurality of sectors (shown as blocks or a grid). In FIG. 4B, sector 305 can include a plurality of pixels 307 associated with the display of the wearable device. More specifically, the plurality of pixels 307 can be associated with the UI 300 as displayed on the display of the wearable device (e.g., the UI 300 does not necessarily encompass the entire display of the wearable device).

A fixation point can correspond to one or more of the plurality of pixels 307. The fixation point can correspond to one or more of the plurality of pixels 307 displaying at least a portion of a UI element a user can interact with causing an operation within the UI, on the wearable device, and/or a device communicatively coupled to the wearable device. The position of the fixation point (e.g., a fixation point position) can be (or be based on) the cartesian coordinate associated with the x-axis (e.g., x-axis 315) and the y-axis (e.g., y-axis 310) associated with the UI 300. Therefore, a fixation point and/or fixation point position can be determined based on the cartesian coordinate of a pixel. The cartesian coordinate of a pixel can be determined by and/or using the eye tracking data (e.g., gaze data 770 described in more detail below).

In some implementations, the accuracy of determining the position of the pixel may not be sufficient for use in determining a fixation point position. Therefore, a fixation point can correspond to one of the plurality of sectors (e.g., sector 305). For example, each of the plurality of sectors (e.g., sector 305) can have a range on the x-axis (e.g., x-axis 315) and a range the y-axis (e.g., y-axis 310) associated with the UI 300. Therefore, a fixation point and/or fixation point position can be determined based on the cartesian coordinate of a current, previous and/or later reached gaze position. The cartesian coordinate of the gaze position can be determined by and/or using the eye tracking data (e.g., gaze data 770 described in more detail below). If the gaze position is within the range on the x-axis and the range on the y-axis, the fixation point position can correspond to the associated sector.

In some implementations, the accuracy of determining the gaze position may not be sufficient for use in determining a fixation point position for an UI element or a portion thereof. Alternatively, or in addition, a pixel density (PD) of a sector may be below a threshold number of pixels. As a result, a UI element (e.g., UI element 442) may not be rendered with a sufficient quality. Therefore, a fixation point can correspond to minimum number of the plurality of sectors. As shown in FIG. 4C, a fixation point can include an N×N grid of sectors (e.g., sector 305). For example, each N×N (shown as 2×2 in FIG. 4C) grid of sectors can have a range on the x-axis (e.g., x-axis 315) and a range on the y-axis (e.g., y-axis 310) associated with the UI 300. Therefore, a fixation point and/or fixation point position can be determined based on the cartesian coordinate of a gaze position. As an example, the cartesian coordinate of the gaze position can be determined by and/or using the eye tracking data (e.g., gaze data 770 described in more detail below). If the gaze position is within the range on the x-axis and the range on the y-axis, the fixation point position can correspond to the associated N×N grid of sectors. In some implementations each of the plurality of sectors and/or N×N grid of sectors can have a corresponding unique identification value or ID.

Figure 4F:
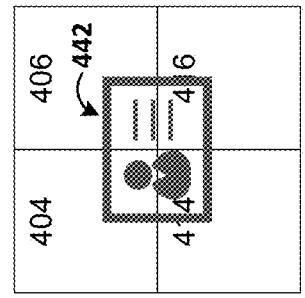
Figure 4D:
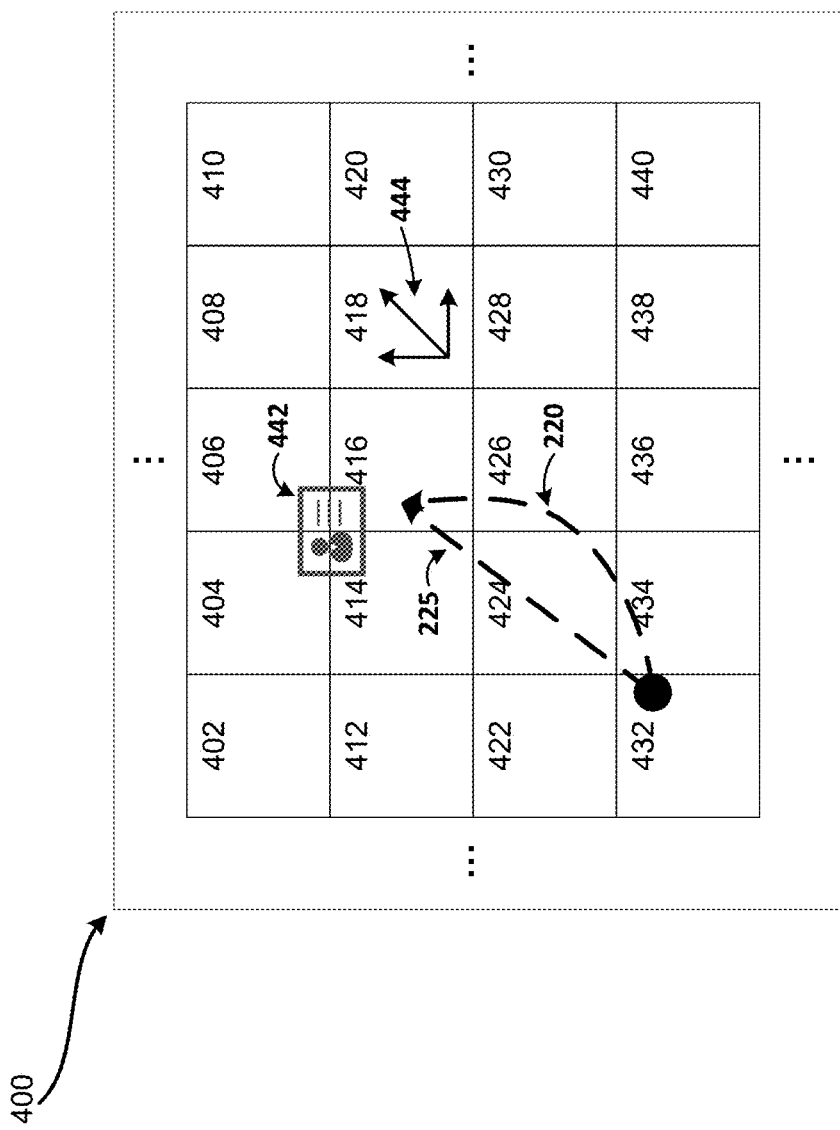

FIG. 4D illustrates a block diagram of a portion of a wearable device UI 300 design. The UI can include a plurality of sectors 302, 304, 306, 308, 410, 412, 414, 416, 418, 420, 422, 424, 426, 428, 430, 432, 434, 436, 438, 440. One or more of the sectors 302-340 can include a UI element 442. In an example implementation, the UI 300 can be configured in a N×N grid of sectors to improve the accuracy of the selection of the UI element 442. In other words, the UI 300 can have a design such that one (1) UI element can be included in a N×N grid of sectors. For example, UI element 442 is shown as within sectors 304, 306, 414, and 416 (e.g., a 2×2 sector or quadrant).

The UI 300 can include discrete pointing vectors 444 to point from one N×N grid of sectors to another N×N grid of sectors (three (3) vectors are shown as an example). As mentioned above, in an example implementation, each N×N grid of sectors can contain a UI element 442. In an example implementation, the gesture module 215 can store (e.g., stored in memory) predefined eye-gaze movements, i.e., an information, e.g., data sets representing predefined eye-gaze movements (sometimes referred to as eye-gaze saccades) and fixation points represented by, for example, discrete pointing vectors 444 within the UI. For example, the pointing vectors 444 can be identified and/or generated when the UI 300 is designed and stored in the gesture module 215.

In some implementations the UI 300 can include a plurality of UI elements. Further, a data map can be associated with the UI. The data map can include a reference to the plurality of UI elements, a reference to the fixation point associated with the plurality of UI elements (e.g., a one-to-one reference), a reference to a vector (e.g., pointing vector) from a first fixation point to a second fixation point, and/or an eye-gaze saccade(s) associated with the plurality of UI elements. In some implementations, the eye-gaze saccade associated with a UI element can be used to identify whether or not an eye-gaze is moving within a UI element or moving to, for example, another UI element. For example, the stored eye-gaze saccade can be a value(s) (e.g., numerical value(s)) representing a threshold (or e range) below which movement can be within a UI element and above which movement can be directed to another UI element. For example, a UI element can be a menu including a plurality of menu items. The associated eye-gaze saccade can indicate whether or not the eye-gaze is moving amongst menu items (e.g., a slow eye-gaze saccade) or to a different UI element (e.g., a fast eye-gaze saccade).

Referring to FIGS. 1, 2E and 3, the eye-gaze module 205 can receive and/or generate eye tracking data (e.g., gaze data 770 described in more detail below). The eye-gaze module 205 can determine if the user's gaze has changed and if the gaze has changed, the eye tracking data can be communicated to the gesture module 215. The gesture module 215 can determine eye-gaze characteristic(s) of the user of the wearable device 110 based on the eye tracking data. The eye-gaze characteristic(s) can include eye-gaze saccade(s) and fixation point(s) and generate a vector. The eye-gaze module 205 can be configured to select (e.g., using a stored map, more detail below) a pointing vector 444 of the UI 300 based on the generated vector.

Simultaneously the head movement module 210 receives head movement data from, for example, an integrated inertial measurement unit (IMU) of the wearable device 110 (e.g., IMU data 733 described in more detail below). The head movement module 210 can determine if the user's head is moving (e.g., above a threshold amount of movement, acceleration, velocity, and/or the like) and if the head is moving, the head movement data can be communicated to the gesture module 215. The gesture module 215 can determine head movement. For example, the gesture module 215 can generate a head motion vector. The head motion vector can include a direction, a velocity, an acceleration, and the like associated with the head movement. In an example implementation, head movement can be minimal because the UI is a head-locked UI. Accordingly, the eye-gaze can be more heavily weighted in a gesture determination as compared to head movement. For example, in some implementations, the eye-gaze characteristic can be confirmed based on the head motion vector. For example, the eye-gaze characteristic can be confirmed as correct if the head motion vector is in the same direction as an eye-gaze vector (e.g., when the eye-gaze characteristic includes an eye-gaze vector.

In an example implementation, whenever the user's eye-gaze changes from one fixation point to another and head motion is along the same vector, a UI element can be identified and highlighted based on the gesture. For example, the gesture module 215 can communicate with the UI element(s) module 220 and identify a UI element based on the selected pointing vector 444 and/or the head motion vector. For example, the UI element(s) module 220 can include a look-up table including a list of UI elements and a corresponding pointing vector 444. In an example implementation, each UI element can have one or more corresponding pointing vectors 444. In other words, a UI element can have a plurality of corresponding pointing vectors because the initial fixation point on the UI 120 can be anywhere on the UI 120.

The selected pointing vector 444 can indicate that the gesture is associated with the N×N grid of sectors including sectors 304, 306, 414, and 416. Accordingly, UI element 442 (as identified in or by the UI element(s) module 220) is selected by the gesture module 215 (see FIG. 4E). Further, the UI element 442 can be highlighted. As an example, as shown in FIG. 4F, the size of the UI element 442 can be modified (e.g., made larger) to highlight the UI element 442. Other techniques for highlighting the UI element 442 are within the scope of this disclosure. For example, a color can be changed, the UI element can be lifted off the display or made 4D, a box can surround the UI element, and the like.

As mentioned above, the head movement can be minimal because the UI is a head-locked UI. Therefore, a minimal amount of head movement can indicate a gesture. However, a head movement that is above a threshold amount of movement, acceleration, velocity, and/or the like, can indicate that the user is not looking at the UI and instead is looking out into the surrounding environment (sometimes called a world view). Accordingly, a head movement that is above a threshold amount of movement, acceleration, velocity, and/or the like may not indicate a gesture and no other UI operations may be triggered.

Additionally, a gesture error can cause a UI operation not to be performed. Alternatively, a UI operation not being performed can cause a gesture error. In some implementations, a gesture error can include detecting a false eye-gaze, detecting a false head motion, and/or detecting that an interaction or gesture has been missed. In an example implementation, the user can re-perform the gesture for correction. Correction movements are distinctively different from regular movements and can be classified into pointing vectors as well. For example, the pointing vector can be multi-dimensional. For example, the pointing vector can be away from the UI element and back toward the UI element. For example, the pointing vector that is away from the UI element can be in a predefined direction (e.g., up, down, left, right, and the like) indicating a re-performance of the previous gesture.

In an example implementation, either head movement or eye movement can be used to determine a gesture. For example, should the eye-gaze module 205 fail to generate eye movement data or the head movement module 210 fail to generate head movement data, the other (eye movement data or head movement data) can be used to determine a gesture. For example, either eye movement data or head movement data can be used to generate a pointing vector and the gesture can be determined based on the pointing vector. Further, in an example implementation, the gesture module 215 can be configured to switch between using eye movement data, head movement data, or both eye movement data and head movement data to determine a gesture. In other words, since both head tracking and eye tracking are both movement oriented, the gesture module 215 can be configured to fluidly switch between eye movement data and/or head movement data without affecting a user interacting with the UI 120 should one of eye movement data or head movement data not be available.

Figure 5:
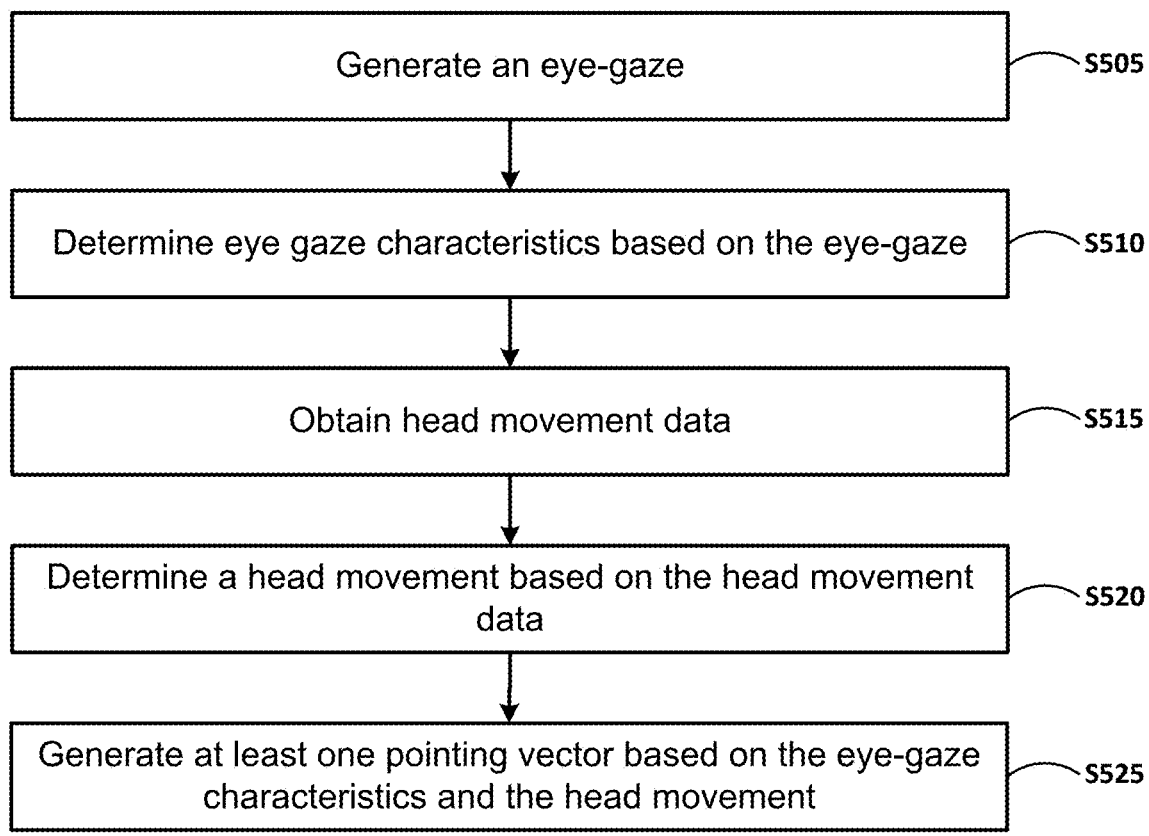
FIG. 5 illustrates a method of generating gesture data according to an example implementation.

FIG. 5 illustrates a method of generating gesture data according to an example implementation. As shown in FIG. 5, in step S505 an eye-gaze is generated. For example, the method can be implemented in a wearable device. The wearable device can include a gaze tracking element, a visual positioning system (VPS), and/or gaze tracking functionality (e.g., eye-gaze module 205). For example, referring to FIG. 7 below, the wearable device can include VPS data 752, including at least one of second position data 754, second orientation data 756, second velocity data 758. Therefore, tracking the eye-gaze can include generating at least one of second position data 754, second orientation data 756, second velocity data 758.

In step S510 eye-gaze characteristics are determined based on the eye-gaze. For example, eye-gaze characteristics can include position data, orientation data, velocity, and the like. In some implementations, eye-gaze characteristics can be derived from position data, orientation data, velocity, and the like. For example, eye-gaze characteristics can include eye-saccades, fixation points (e.g., positions on a UI), and the like. In some implementations, the eye-gaze characteristics can be determined, generated, calculated, and/or the like based on the neural network data 742, gaze data 752, and/or the VPS data 752. As an example, direction can be calculated based on the first position data 744 and the second position data 754.

In step S515 head movement data is obtained. For example, the wearable device can include a head tracking element, an inertial measurement unit (IMU), and/or head tracking functionality (e.g., head movement module 210). For example, referring to FIG. 7 below, the wearable device can include IMU data 733. For example, the IMU data 733 can include rotational velocity data 734, acceleration data 735, position data 737, orientation data 738, and velocity data 739, that are derived from the gyro and accelerometer measurements associated with an IMU. In some implementations, head movement data can be derived from rotational velocity data 734, acceleration data 735, position data 737, orientation data 738, and velocity data 739, and/or the like. For example, the head movement data can include a head motion vector derived from rotational velocity data 734, acceleration data 735, position data 737, orientation data 738, and velocity data 739, and/or the like. The head motion vector can include a direction, a velocity, an acceleration, and the like associated with the head movement.

In step S520 a head movement is determined based on the head movement data. For example, the head movement can include the head motion vector including a direction, a velocity, an acceleration, and the like. In an example implementation, the position data 737, orientation data 738, and velocity data 739 can be used to calculate head movement direction (e.g., using two or more of sequential position data 737 and sequential orientation data 738) and a head movement velocity based on the velocity data 739.

In step S525 at least one pointing vector is determined based on the eye-gaze characteristics and the head movement. For example, the wearable device can have a UI operating on a display of the wearable device. The UI can have an associated map including a plurality of pointing vectors associated with UI elements. The map can also include a fixation point associated with the UI element. Therefore, a pointing vector can include the fixation point on the UI and a vector (e.g., a direction from one fixation point to another). In some implementations, determining a pointing vector can include selecting the pointing vector. For example, determining a pointing vector can include looking up (e.g., filtering) in a map based on variables that make-up the pointing vector based on a UI element, the eye-gaze characteristics and/or the head movement.

Figure 6A:
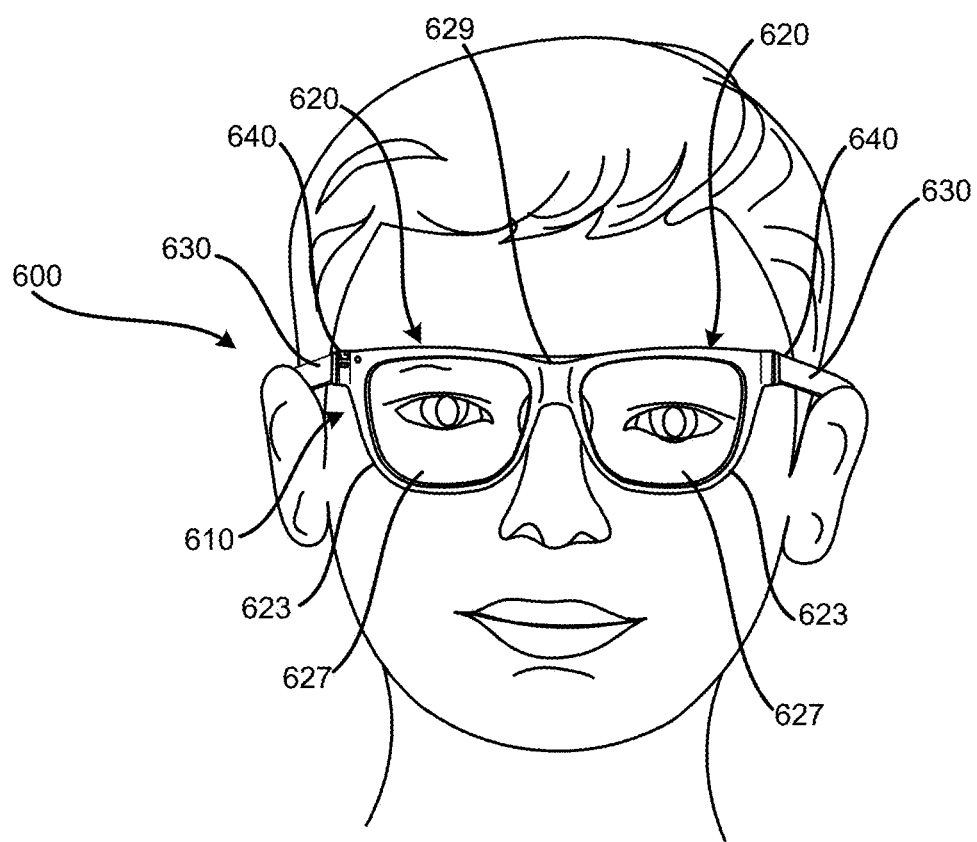
FIG. 6A illustrates an example head mounted wearable device worn by a user.
Figure 6B:
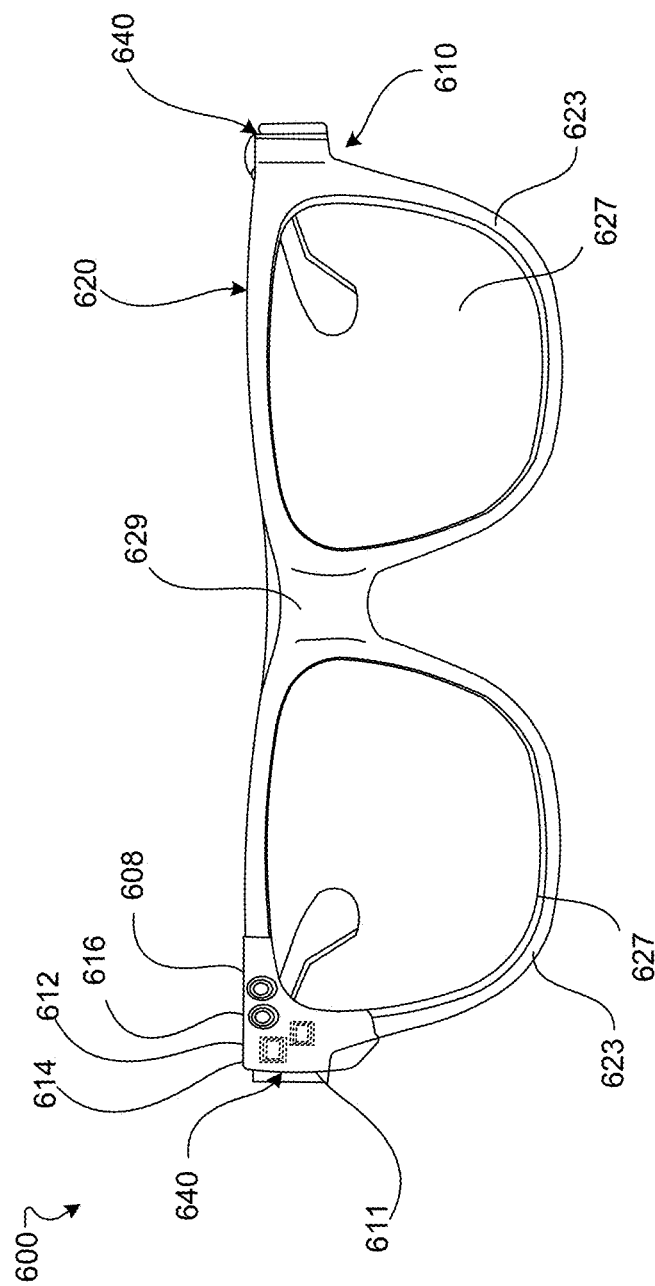
FIG. 6B is a front view.
Figure 6C:
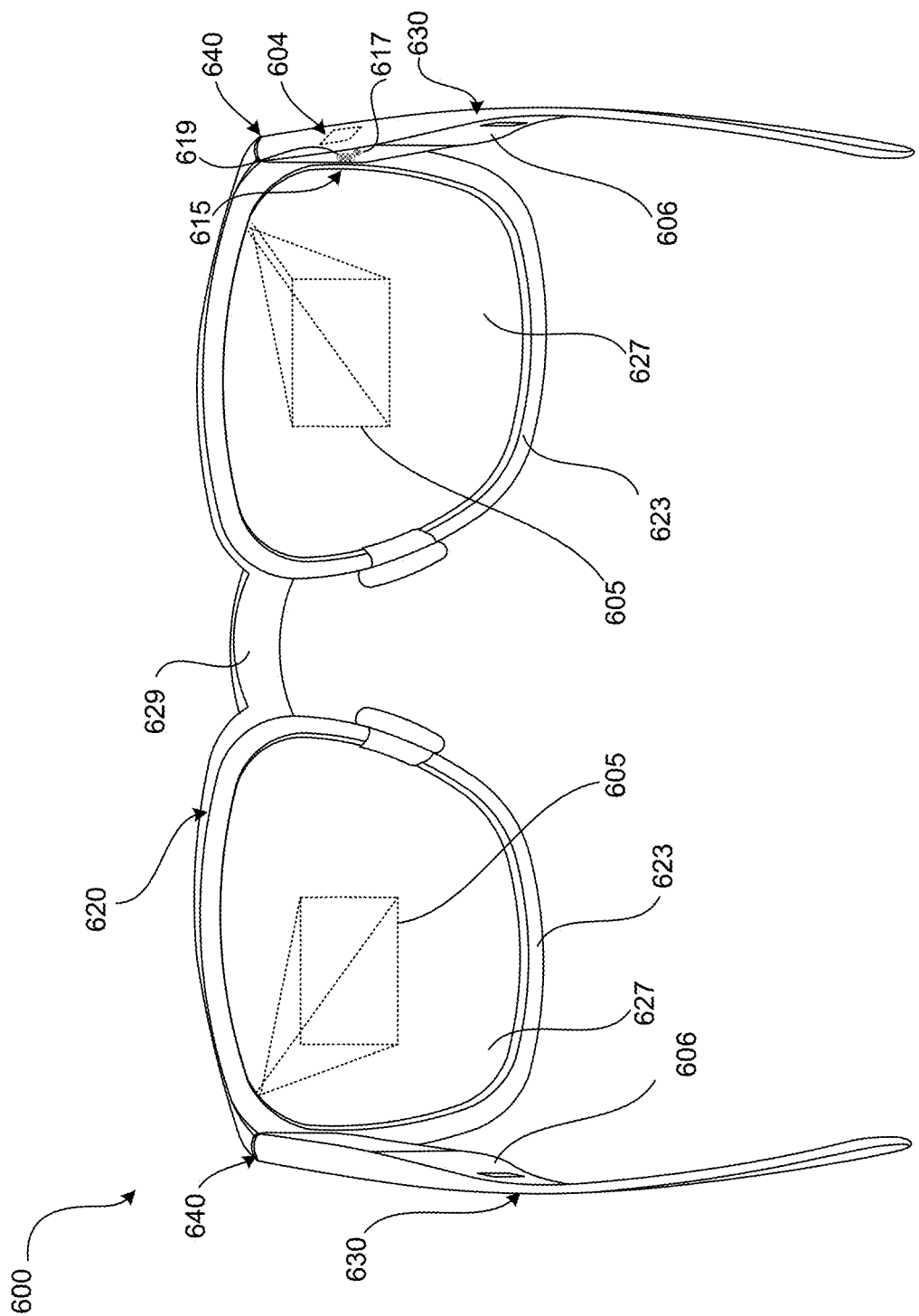
FIG. 6C is a rear view of the example head mounted wearable device shown in FIG. 6A.

Augmented reality and virtual reality (AR/VR) systems can use wearable devices, for example, head mounted displays (HMD), smartglasses, and the like. In some wearable devices, a gesture used to select a UI element can be based on an eye-gaze characteristic and a user head movement. The gesture can be based on a correlation between the eye-gaze characteristic and the user head movement. FIGS. 6A, 6B, and 6C describe smartglasses as an example of a wearable device configured to use a correlation between the eye-gaze characteristic and the user head movement as a gesture used to select a UI element on a UI of the smartglasses.

FIG. 6A illustrates a user wearing an example smartglasses 500, including display capability, eye/gaze tracking capability, and computing/processing capability. FIG. 6B is a front view, and FIG. 6C is a rear view of the example smartglasses 500 shown in FIG. 6A.

The example smartglasses 500 can be configured to track user eye-gaze, determine a characteristic(s) of the tracked user eye-gaze, determine a head movement of the user wearing the smartglasses 500, and generate a gesture based on the eye-gaze characteristic(s) and the user head movement. The example smartglasses 500 can be configured to display a user interface (UI) on a display of the smartglasses 500. The UI can be a head-locked UI. The generated gesture can be used to select a UI element of the head-locked UI. The selected UI element can be configured to trigger a UI operation associated with the head-locked UI.

The example smartglasses 500 includes a frame 610. The frame 610 includes a front frame portion 620, and a pair of temple arm portions 630 rotatably coupled to the front frame portion 620 by respective hinge portions 640. The front frame portion 620 includes rim portions 623 surrounding respective optical portions in the form of lenses 627, with a bridge portion 629 connecting the rim portions 623. The temple arm portions 630 are coupled, for example, pivotably or rotatably coupled, to the front frame portion 620 at peripheral portions of the respective rim portions 623. In some examples, the lenses 627 are corrective/prescription lenses. In some examples, the lenses 627 are an optical material including glass and/or plastic portions that do not necessarily incorporate corrective/prescription parameters.

In some examples, the smartglasses 500 includes a display device 505 that can output visual content, so that visual content is visible to the user. In the example shown in FIGS. 6B and 6C, the display device 505 is provided in one of the two arm portions 630, simply for purposes of discussion and illustration. Display devices 505 may be provided in each of the two arm portions 630 to provide for binocular output of content. In some examples, the display device 505 may be a see-through near eye display. In some examples, the display device 505 may be configured to project light from a display source onto a portion of teleprompter glass functioning as a beamsplitter seated at an angle (e.g., 30-45 degrees). The beamsplitter may allow for reflection and transmission values that allow the light from the display source to be partially reflected while the remaining light is transmitted through. Such an optic design may allow a user to see both physical items in the world, for example, through the lenses 627, next to content (for example, digital images, user interface elements, virtual content, and the like) output by the display device 505. In some implementations, waveguide optics may be used to depict content on the display device 505. The digital images can be rendered at an offset from the physical items in the world due to errors in head pose data. Therefore, example implementations can use a harmonic exponential filter in a head pose signal processing pipeline to correct for the errors in the head pose data.

As mentioned above, the display device 505 can output visual content, so that the visual content is visible to the user. In some implementations, the visual content can include (and/or be) a user interface. The UI can include at least one UI element. A UI element can include screens, windows, buttons, menus, toggles, icons, and/or other visual elements that a user uses to interact with the smartglasses 500. Typically, a pointer device (e.g., a mouse) can be used to direct cursors and make selections on a UI operating on a computing device. However, a pointer device may not be practical for use on a wearable device. Therefore, a gesture can be used to interact with the UI operating on the smartglasses 500. The gesture can be generated based on an eye-gaze characteristic(s) associated with gaze tracking of the user of the smartglasses 500 eyes and a head movement of the user of the smartglasses 500.

In some implementations, the UI can be head-locked, in that the UI remains in a same location on the display 505 when the user moves the user's head and/or the smartglasses 500 move. For example, overlaid AR content can move along with the user's head movements while staying in the user's field of view (FOV). As an example, in a head-locked visual UI, the position and orientation of the overlaid AR content in the AR display depends only on the position and orientation of the viewer's head (as if the AR object or content were rigidly attached by a rigid rod to the viewer's head) independent of any features of the real-world scene. The overlaid AR content may move across the real-world scene in the AR display instantly in response to viewer's head movements for all types (e.g., all amplitudes, frequencies, and directions, 6 degree of freedom (6DoF) movements) of the viewer's head motions. For example, a circular or sinusoidal frequency head motion will cause the overlaid AR content to move across the real-world scene at the same circular or sinusoidal frequency as the head motion. Further, for example, a tilt or roll head motion will cause the overlaid AR content to tilt away from a gravity vertical at the same angle as the head motion tilt or roll away from the gravity vertical.

In some examples, the sensing system 611 may include various sensing devices and the control system 612 may include various control system devices including, for example, one or more processors 614 operably coupled to the components of the control system 612. In some examples, the control system 612 may include a communication module providing for communication and exchange of information between the smartglasses 500 and other external devices. In some examples, the smartglasses 500 includes a gaze tracking device 615 to detect and track eye-gaze direction and movement. The gaze tracking device 615 can include sensors 617, 619 (e.g., cameras). Data captured by the gaze tracking device 615 may be processed to detect and track gaze direction and movement as a user input. In the example shown in FIGS. 6B and 6C, the gaze tracking device 615 is provided in one of the two arm portions 630, simply for purposes of discussion and illustration. In the example arrangement shown in FIGS. 6B and 6C, the gaze tracking device 615 is provided in the same arm portion 630 as the display device 505, so that user eye-gaze can be tracked not only with respect to objects in the physical environment, but also with respect to the content output for display by the display device 505. In some examples, gaze, or gaze tracking devices 615 may be provided in each of the two arm portions 630 to provide for gaze tracking of each of the two eyes of the user. In some examples, display devices 505 may be provided in each of the two arm portions 630 to provide for binocular display of visual content.

In some examples, the smartglasses 500 includes one or more of an audio output device 506 (such as, for example, one or more speakers), an illumination device 508, a sensing system 611, a control system 612, at least one processor 614, and an outward facing image sensor, or world-facing camera 616. In an example implementation, the outward facing image sensor, or world-facing camera 616 can be used to generate image data used to generate head pose data. The world-facing camera 616 can include an inertial measurement unit (IMU). Alternatively (or in addition to), the IMU can be a separate module included in the smartglasses 500. For example, the IMU can be included in one of the two arm portions 630. The IMU can include a set of gyros configured to measure rotational velocity and an accelerometer configured to measure an acceleration of the world-facing camera 616 as the camera moves with the head and/or body or the user. In an example implementation, the world-facing camera 616 and/or the IMU can be used in a head pose data generation operation (or processing pipeline).

Figure 7:
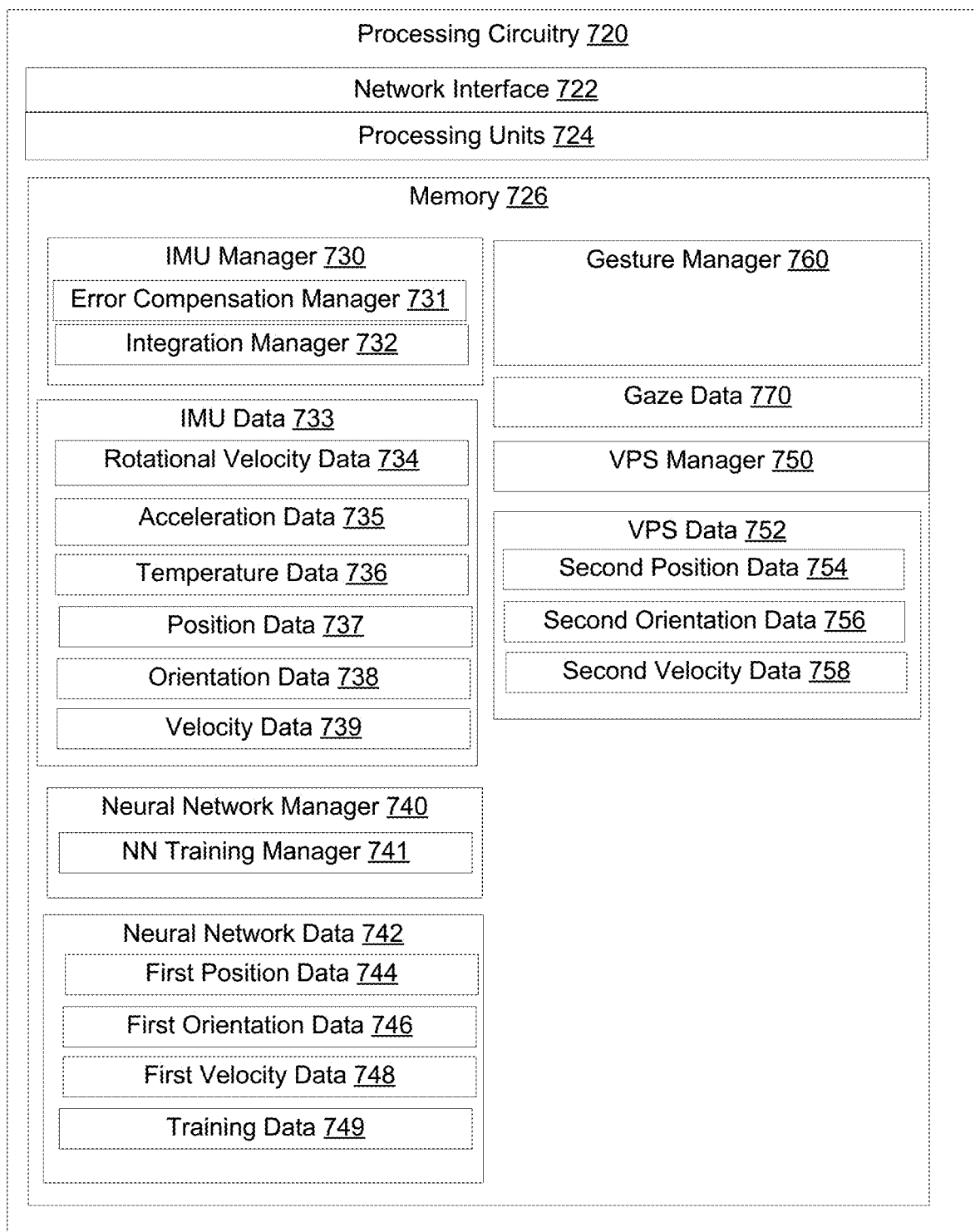
FIG. 7 is a diagram illustrating an example apparatus for performing mixed gaze tracking according to an example implementation.

FIG. 7 is a diagram that illustrates an example of processing circuitry 720. In an example implementation, the processing circuitry 720 can include circuitry (e.g., a signal processing pipeline) configured to generate gaze tracking data. The gaze tracking data can be generated based on image data and/or IMU data.

In some implementations, one or more of the components of the processing circuitry 720 can be, or can include processors (e.g., processing units 724) configured to process instructions stored in the memory 726. Examples of such instructions as depicted in FIG. 7 include IMU manager 730, neural network manager 740, visual positioning system manager 750, and gesture manager 760. Further, as illustrated in FIG. 7, the memory 726 is configured to store various data, which is described with respect to the respective managers that use such data.

The IMU manager 730 is configured to obtain IMU data 733. In some implementations, the IMU manager 730 obtains the IMU data 733 wirelessly (e.g., from the IMU associated with the world-facing camera 616). As shown in FIG. 7, the IMU manager 730 includes an error compensation manager 731 and an integration manager 732.

The error compensation manager 731 is configured to receive IMU output (IMU data 733) from, e.g., IMU manager 730, and use the IMU intrinsic parameter values to compensate the IMU output for errors. The error compensation manager 731 is then configured to, after performing the error compensation, produce the IMU data 733.

The integration manager 732 is configured to perform integration operations (e.g., summing over time-dependent values) on the IMU data 733. Notably, the rotational velocity data 734 is integrated over time to produce an orientation. Moreover, the acceleration data 735 is integrated over time twice to produce a position. Accordingly, the integration manager 732 produces a 6DoF pose (position and orientation) from the IMU output, i.e., rotational velocity data 734 and acceleration data 735.

The IMU data 733 represents the gyro and accelerometer measurements, and acceleration data 735 in a world frame (as opposed to a local frame, i.e., frame of the IMU), compensated for an error(s). Moreover, IMU data 733 includes 6DoF pose and movement data, position data 737, orientation data 738, and velocity data 739, that are derived from the gyro and accelerometer measurements. Finally, in some implementations, the IMU data 733 also includes IMU temperature data 736; this may indicate further error in the rotational velocity data 734 and acceleration data 735.

The neural network manager 740 is configured to take as input the rotational velocity data 734 and acceleration data 735 and produce the neural network data 742 including first position data 744, first orientation data 746, and first velocity data 748. In some implementations, the input rotational velocity data 734 and acceleration data 735 are produced by the error compensation manager 731 acting on raw IMU output values, i.e., with errors compensated by IMU intrinsic parameter values. As shown in FIG. 7, the neural network manager 740 includes a neural network training manager 741.

The neural network training manager 741 is configured to take in training data 749 and produce the neural network data 742, including data concerning layers and cost functions and values. In some implementations, the training data 749 includes movement data taken from measurements of, for example, users wearing smartglasses 500 and moving their heads and other parts of their bodies, as well as ground truth 6DoF pose data taken from those measurements. In some implementations, the training data 749 includes measured rotational velocities and accelerations from the movement, paired with measured 6DoF poses and velocities.

In addition, in some implementations, the neural network manager 740 uses historical data from the IMU to produce the first position data 744, first orientation data 746, and first velocity data 748. For example, the historical data is used to augment the training data 749 with maps of previous rotational velocities, accelerations, and temperatures to their resulting 6DoF pose and movement results and hence further refine the neural network. In some implementations, the neural network represented by the neural network manager 740 is a convolutional neural network, with the layers being convolutional layers.

The visual positioning system (VPS) manager 750 is configured to take as input an image and produce VPS data 752, including second position data 754, second orientation data 756; in some implementations, the VPS data also includes second velocity data 758, i.e., 6DoF pose based on an image. In some implementations, the image is obtained with the world-facing camera (e.g., the world-facing camera 616) on the frame of the smartglasses 500.

Further, the processing circuitry 720 can include a network interface 722, one or more processing units 724, and nontransitory memory 726. The network interface 722 includes, for example, Ethernet adaptors, Token Ring adaptors, Bluetooth adaptors, WiFi adaptors, NFC adaptors, and the like, for converting electronic and/or optical signals received from the network to electronic form for use by the processing circuitry 720. The set of processing units 724 include one or more processing chips and/or assemblies. The memory 726 includes both volatile memory (e.g., RAM) and non-volatile memory, such as one or more ROMs, disk drives, solid state drives, and the like. The set of processing units 724 and the memory 726 together form processing circuitry, which is configured and arranged to carry out various methods and functions as described herein. Therefore, the set of processing units 724 and the memory 726 together form processing circuitry the signal processing pipeline configured to generate corrected head pose data using a harmonic exponential filter (e.g., included in the gesture manager 760).

Figure 8:
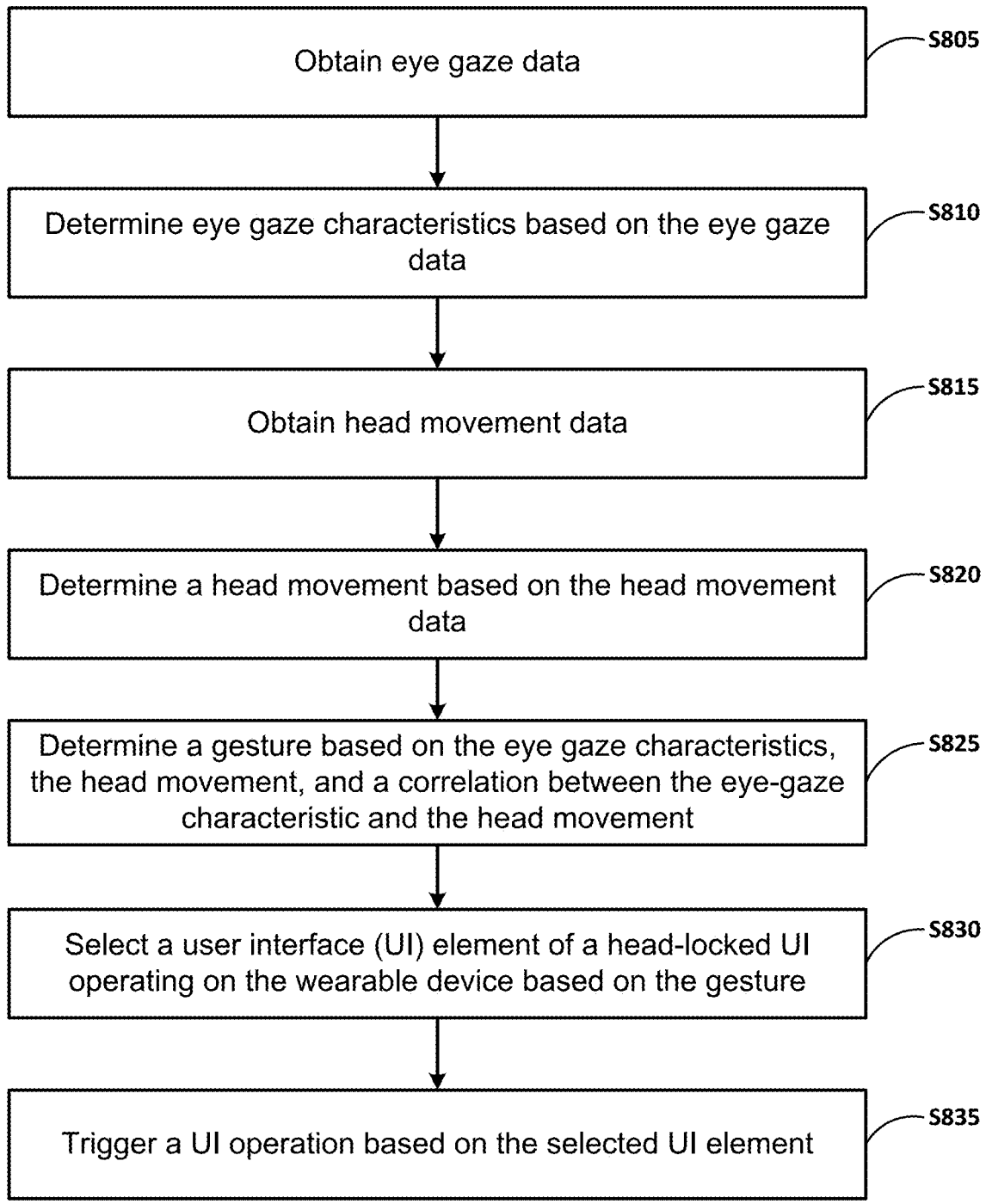
FIG. 8 illustrates a block diagram of a method of operating a wearable device according to an example implementation.

Example 1. FIG. 8 is a block diagram of a method of operating a wearable device according to an example implementation. As shown in FIG. 8, in step S805 obtain (e.g., receive) eye-gaze data. In step S810 determine an eye-gaze characteristic of a user of a wearable device based on eye-gaze data. For example, a wearable device can include an eye-tracking module configured to track eye movement using, for example, a rear, inward, or eye-facing camera. The eye-tracking module can be configured to generate, communicate, and/or store eye-gaze characteristic(s). The eye-gaze characteristic(s) can include saccades, an eye-gaze vector, a glint vector, a glint spot, a timestamp associated with the eye-gaze vector, and/or a velocity associated with the eye-gaze vector.

In step S815 obtain (e.g., receive) head movement data. In step S820 determine a head movement of the user based on the head movement data. For example, the wearable device can include an IMU used to track head movement of the user wearing the wearable device. The IMU can be configured to generate, store, and/or communicate IMU data as head motion data including (or used to generate) the head motion vector. For example, the IMU data can include tracking (e.g., storing time-stamped data) including position, direction, orientation, and the like of the head. The head motion vector can be calculated based on the IMU data.

In step S825 determining a gesture based on the eye-gaze characteristic, the head movement, and a correlation between the eye-gaze characteristic and the head movement. In an example implementation, gaze tracking can be used to determine a gesture by combining a current gaze position, head movement, and gaze movement. For example, a gesture can be determined by determining the current gaze position, determining a head movement and determining a gaze movement and combining the three as a gesture. For example, referring to FIG. 3E, the gesture can be determined based on the gaze position 305, head movement along line 320 and the gaze movement along line 325. Further, whenever the user's eye-gaze changes a head motion should be along the same vector as the eye-gaze vector thus confirming the eye-gaze. Moving along the same vector can indicate a correlation between the eye-gaze characteristic and the head movement. If not, the eye-gaze could be identified as a faulty measurement (e.g., a false eye-gaze detection).

In step S830 selecting a user interface (UI) element of a head-locked UI displayed, operating, processing, executing, and/or the like on the wearable device based on the gesture. In some implementations, the gesture can be used to identify a fixation point on the UI. In some implementations, a map can include a link between a fixation point and a UI element located at the fixation point. Therefore, determining the gesture can include identifying a fixation point and using the map to identify the UI element located at the fixation point within the UI. In step S835 trigger a UI operation based on the UI element. A UI element can have an associated UI operation. For example, a UI operation can be configured to display an image. Therefore, interacting with the UI element located at the second fixation point can trigger the displaying of the image on the display of the wearable device. Details associated with each of these steps can be further described above.

Example 2. The method of Example 1, wherein the eye-gaze characteristic can include at least one of an eye-gaze saccade and a fixation point. In some implementations, the eye-gaze saccade can indicate whether or not an eye-gaze is moving within a UI element or moving to, for example, another UI element. For example, a UI element can be a menu including a plurality of menu items. The associated eye-gaze saccade can indicate whether or not the eye-gaze is moving amongst menu items (e.g., a slow eye-gaze saccade) or to a different UI element (e.g., a fast eye-gaze saccade). In some implementations, if the eye-gaze saccade is below a threshold value, the method of Example 1 may stop after step S810 because there is no need to generate a gesture based on the eye-gaze. Alternatively, or in addition, the UI Element can include sub-elements (e.g., menu items). Accordingly, the second fixation point can be associated with a sub-element within the UI element.

Example 3. The method of Example 1, wherein the head movement can include a head motion vector. For example, the wearable device can include an IMU used to track head movement of the user wearing the wearable device. The IMU can be configured to generate, store, and/or communicate IMU data as head motion data including (or used to generate) the head motion vector. For example, the IMU data can include tracking (e.g., storing time-stamped data) including position, direction, orientation, and the like of the head. The head motion vector can be calculated based on the IMU data. Further, whenever the user's eye-gaze changes from one fixation point to another and head motion should be along the same vector as the eye-gaze vector thus confirming the eye-gaze. If not, the eye-gaze could be identified as a faulty measurement (e.g., a false eye-gaze detection).

Example 4. The method of Example 1, wherein the UI element can be associated with an N×N block of the UI, and the UI operation causes a UI element characteristic to change.

Example 5. The method of Example 1, wherein the correlation between the eye-gaze characteristic and the head movement can indicate that the user is looking outside a boundary of the UI, and the UI operation causes the UI to be hidden.

Example 6. The method of Example 1 can further include identifying one of a false eye-gaze detection, head motion detection, or missed UI interaction, and in response to identifying one of a false eye-gaze detection, head motion detection, or missed UI interaction, causing the UI operation not to be performed.

Example 7. The method of Example 1, can further include determining a second eye-gaze characteristic, determining a second head movement, selecting a second UI element based on a correlation between the second eye-gaze characteristic and the head movement characteristic as an indicator correlation, and triggering a user interface (UI) operation based on the selected second UI element.

Example 8. A method can include any combination of one or more of Example 1 to Example 7.

Example 9. A non-transitory computer-readable storage medium comprising instructions stored thereon that, when executed by at least one processor, are configured to cause a computing system to perform the method of any of Examples 1-8.

Example 10. An apparatus comprising means for performing the method of any of Examples 1-8.

Example 11. An apparatus comprising at least one processor and at least one memory including computer program code, the at least one memory and the computer program code configured to, with the at least one processor, cause the apparatus at least to perform the method of any of Examples 1-8.

Example implementations can include a non-transitory computer-readable storage medium comprising instructions stored thereon that, when executed by at least one processor, are configured to cause a computing system to perform any of the methods described above. Example implementations can include an apparatus including means for performing any of the methods described above. Example implementations can include an apparatus including at least one processor and at least one memory including computer program code, the at least one memory and the computer program code configured to, with the at least one processor, cause the apparatus at least to perform any of the methods described above.

Various implementations of the systems and techniques described here can be realized in digital electronic circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example implementations may include various modifications and alternative forms, implementations thereof are shown by way of example in the drawings and will herein be described in detail. It should be understood, however, that there is no intent to limit example implementations to the particular forms disclosed, but on the contrary, example implementations are to cover all modifications, equivalents, and alternatives falling within the scope of the claims. Like numbers refer to like elements throughout the description of the figures.

Some of the above example implementations are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example implementations. Example implementations, however, be embodied in many alternate forms and should not be construed as limited to only the implementations set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example implementations. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular implementations only and is not intended to be limiting of example implementations. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example implementations belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example implementations and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative implementations, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example implementations are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example implementations are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or implementations herein disclosed irrespective of whether or not that particular combination has been specifically enumerated in the accompanying claims at this time.

What is claimed is:

1. A non-transitory computer-readable storage medium comprising instructions stored thereon that, when executed by at least one processor, are configured to cause a computing system to:
    display a user interface (UI) including a grid of blocks;
    identify a direction based on an eye-gaze, the direction being from a first block to a second block of the grid of blocks;
    identify a UI element displayed on the UI based on the direction;
    determine an eye-gaze characteristic of a user of a wearable device;
    determine a head movement of the user, the UI being configured to remain stationary on a display of the wearable device in relation to the head movement;
    determine a gesture based on the eye-gaze characteristic, the head movement, and a correlation between the eye-gaze characteristic and the head movement;
    select the UI element based on the gesture; and
    trigger a UI operation in response to selecting the UI element.

2. The non-transitory computer-readable storage medium of claim 1, wherein the eye-gaze characteristic includes at least one of an eye-gaze saccade and a fixation point associated with a vector.

3. The non-transitory computer-readable storage medium of claim 1, wherein
    the direction is a pointing vector, and
    the head movement includes a head motion vector.

4. The non-transitory computer-readable storage medium of claim 1, wherein
the UI element is associated with two or more blocks of the UI, and
the UI operation causes a UI element characteristic to change.

5. The non-transitory computer-readable storage medium of claim 1, wherein
the correlation between the eye-gaze characteristic and the head movement indicates that the user is looking outside a boundary of the UI, and
the UI operation causes the UI to be hidden.

6. The non-transitory computer-readable storage medium of claim 1, the instructions further cause the computing system to:
identify one of a false eye-gaze detection, head motion detection, or missed UI interaction, and
in response to identifying one of a false eye-gaze detection, head motion detection, or missed UI interaction, causing the UI operation not to be performed.

7. The non-transitory computer-readable storage medium of claim 6, the instructions further cause the computing system to:
determine a second eye-gaze characteristic;
determine a second head movement;
select a second UI element based on a correlation between the second eye-gaze characteristic and the second head movement as an indicator correlation; and
trigger a user interface (UI) operation in response to selecting the second UI element.

8. A method comprising:
displaying a user interface (UI) including a grid of blocks;
identifying a direction based on an eye-gaze, the direction being from a first block to a second block of the grid of blocks;
identifying a UI element displayed on the UI based on the direction;
determining an eye-gaze characteristic of a user of a wearable device;
determining a head movement of the user, the UI being configured to remain stationary on a display of the wearable device in relation to the head movement;
determining whether the user of the wearable device intends to perform a gesture based on at least one of the eye-gaze characteristic and the head movement; and
in response to determining the user of the wearable device intends to perform a gesture;
determining a gesture based on the eye-gaze characteristic, the head movement, and a correlation between the eye-gaze characteristic and the head movement;
selecting the UI element based on the gesture; and
triggering a UI operation in response to selecting the UI element.

9. The method of claim 8, wherein the eye-gaze characteristic includes at least one of an eye-gaze saccade and a fixation point associated with a vector.

10. The method of claim 8, wherein
the direction is a pointing vector, and
the head movement includes a head motion vector.

11. The method of claim 8, wherein
the UI element is associated with two or more blocks of the UI, and
the UI operation causes a UI element characteristic to change.

12. The method of claim 8, wherein
the correlation between the eye-gaze characteristic and the head movement indicates that the user is looking outside a boundary of the UI, and
the UI operation causes the UI to be hidden.

13. The method of claim 8, further comprising:
identifying one of a false eye-gaze detection, head motion detection, or missed UI interaction, and
in response to identifying one of a false eye-gaze detection, head motion detection, or missed UI interaction, causing the UI operation not to be performed.

14. The method of claim 13, further comprising:
determining a second eye-gaze characteristic;
determining a second head movement;
selecting a second UI element based on a correlation between the second eye-gaze characteristic and the second head movement as an indicator correlation; and
triggering a user interface (UI) operation in response to selecting the second UI element.

15. An apparatus comprising at least one processor and at least one memory including computer program code, the at least one memory and the computer program code configured to, with the at least one processor, cause the apparatus to:
display a user interface (UI) including a grid of blocks;
identify a direction based on an eye-gaze, the direction being from a first block to a second block of the grid of blocks;
identify a UI element displayed on the UI based on the direction;
determine an eye-gaze characteristic of a user of a wearable device;
determine a head movement of the user, the UI being configured to remain stationary on a display of the wearable device in relation to the head movement;
determine a gesture based on the eye-gaze characteristic, the head movement, and a correlation between the eye-gaze characteristic and the head movement;
select the UI element based on the gesture; and
trigger a UI operation in response to selecting the UI element.

16. The apparatus of claim 15, wherein the eye-gaze characteristic includes at least one of an eye-gaze saccade and a fixation point.

17. The apparatus of claim 15, wherein
the direction is a pointing vector, and
the head movement includes a head motion vector.

18. The apparatus of claim 15, wherein
the UI element is associated with two or more blocks of the UI, and
the UI operation causes a UI element characteristic to change.

19. The apparatus of claim 15, the computer program code further causes the apparatus to:
identify one of a false eye-gaze detection, head motion detection, or missed UI interaction, and
in response to identifying one of a false eye-gaze detection, head motion detection, or missed UI interaction, causing the UI operation not to be performed.

20. The apparatus of claim 19, the computer program code further causes the apparatus to:
determine a second eye-gaze characteristic;
determine a second head movement;
select a second UI element based on a correlation between the second eye-gaze characteristic and the second head movement as an indicator correlation; and trigger a user interface (UI) operation in response to selecting the second UI element.

\* \* \* \* \*